(12) United States Patent
Kasturi et al.

(10) Patent No.: US 8,040,808 B1
(45) Date of Patent: Oct. 18, 2011

(54) SERVICE AWARE PATH SELECTION WITH A NETWORK ACCELERATION DEVICE

(75) Inventors: Rohini Kasturi, Livermore, CA (US); Nitin Gugle, Cupertino, CA (US); Sravan Vadlakonda, Sunnyvale, CA (US); Steven A. Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 141 days.

(21) Appl. No.: 12/254,034

(22) Filed: Oct. 20, 2008

(51) Int. Cl.
*H04L 12/28* (2006.01)

(52) U.S. Cl. .......................... 370/238; 370/401

(58) Field of Classification Search .................. None
See application file for complete search history.

(56) References Cited

U.S. PATENT DOCUMENTS

| | | | | |
|---|---|---|---|---|
| 5,598,532 | A * | 1/1997 | Liron | 703/2 |
| 6,301,244 | B1 * | 10/2001 | Huang et al. | 370/351 |
| 6,377,551 | B1 * | 4/2002 | Luo et al. | 370/238 |
| 6,473,405 | B2 * | 10/2002 | Ricciulli | 370/238 |
| 6,981,055 | B1 * | 12/2005 | Ahuja et al. | 709/238 |
| 7,020,087 | B2 * | 3/2006 | Steinberg et al. | 370/238 |
| 7,167,593 | B2 | 1/2007 | Singh | |
| 7,200,117 | B2 * | 4/2007 | Chiu et al. | 370/238 |
| 7,254,138 | B2 * | 8/2007 | Sandstrom | 370/412 |
| 7,289,489 | B1 * | 10/2007 | Kung et al. | 370/352 |
| 7,339,897 | B2 * | 3/2008 | Larsson et al. | 370/252 |
| 7,403,487 | B1 | 7/2008 | Foladare et al. | |
| 7,496,661 | B1 * | 2/2009 | Morford et al. | 709/224 |
| 7,584,298 | B2 | 9/2009 | Klinker et al. | |
| 7,599,385 | B1 * | 10/2009 | Andrade et al. | 370/437 |
| 7,643,408 | B2 * | 1/2010 | Atkinson et al. | 370/217 |
| 7,650,426 | B2 * | 1/2010 | Bamba | 709/238 |
| 7,688,739 | B2 * | 3/2010 | Frei et al. | 370/238 |
| 7,792,991 | B2 * | 9/2010 | Shand | 709/241 |
| 2004/0001514 | A1 | 1/2004 | Wookey et al. | |
| 2004/0044912 | A1 | 3/2004 | Connary et al. | |

(Continued)

FOREIGN PATENT DOCUMENTS

WO 2007070838 A2 6/2007

(Continued)

OTHER PUBLICATIONS

Co-pending U.S. Appl. No. 12/198,652, Kasturi et al. "Adaptively Applying Network Acceleration Services with an Intermediate Network Device", filed Aug. 26, 2008, common assignee and subject matter to present application.*

(Continued)

*Primary Examiner* — Gregory Sefcheck
(74) *Attorney, Agent, or Firm* — Shumaker & Sieffert, P.A.

(57) ABSTRACT

An intermediate network device performs service aware path selection. For example, the intermediate network device comprises a network interface that receives network traffic and a control unit that couples to the network interface. The control unit comprises a storage medium that stores a first set of cost factors for a first path from the intermediate network device to another intermediate network device. The first set of cost factors includes at least one optimization cost factor corresponding to intermediate optimization capabilities available to the intermediate network device that offset other cost factors of the first set. The storage medium also stores a second set of cost factors for a second path between the devices. The control unit selects either the first path or the second path over which to forward the network traffic based on the first and second sets of cost factors.

27 Claims, 4 Drawing Sheets

U.S. PATENT DOCUMENTS

| | | | |
|---|---|---|---|
| 2006/0146825 A1 | 7/2006 | Hofstaedter et al. | |
| 2006/0156403 A1 | 7/2006 | Haeffele et al. | |
| 2008/0091812 A1* | 4/2008 | Lev-Ran et al. | 709/223 |
| 2008/0112325 A1* | 5/2008 | Sivakumar et al. | 370/238 |
| 2008/0123533 A1 | 5/2008 | Vasseur et al. | |
| 2008/0222283 A1* | 9/2008 | Ertugrul et al. | 709/224 |
| 2008/0225710 A1 | 9/2008 | Raja et al. | |
| 2008/0320151 A1* | 12/2008 | McCanne et al. | 709/228 |
| 2009/0034417 A1 | 2/2009 | Kondamuru et al. | |
| 2009/0067440 A1 | 3/2009 | Chadda et al. | |
| 2009/0092137 A1* | 4/2009 | Haigh et al. | 370/392 |
| 2009/0287968 A1* | 11/2009 | Lee et al. | 714/699 |
| 2010/0085892 A1* | 4/2010 | Kouhi | 370/254 |

FOREIGN PATENT DOCUMENTS

| | | |
|---|---|---|
| WO | 2008070549 A2 | 6/2008 |

OTHER PUBLICATIONS

Co-pending U.S. Appl. No. 12/409,618, Kasturi et al. "Routing Protocol Extension for Network Acceleration Service-Aware Path Selection within Computer Networks", filed Mar. 24, 2009, common assignee and subject matter to present application.*

L. Berger et al., "The OSPF Opaque LSA Option," Network Working Group RFC 5250, Jul. 2008, 16 pgs.

U.S. Appl. No. 12/409,618 entitled Routing Protocol Extension for Network Acceleration Service-Aware Path Selection Within Computer Networks, filed Mar. 24, 2009.

"Application Flow Acceleration for Web (HTTP) Traffic," Juniper Networks, Inc., 2005, 8 pgs.

U.S. Appl. No. 12/198,652, filed Aug. 26, 2008 entitled, "Adaptively Applying Network Acceleration Services With an Intermediate Network Device," Rohini Kasturi et al.

Office Action for U.S. Appl. No. 12/198,652 dated Jul. 30, 2010, 48 pp.

Response to Office Action for U.S. Appl. No. 12/198,652 dated Nov. 1, 2010, 26 pp.

Office Action from U.S. Appl. No. 12/198,652, dated Jan. 25, 2011, 38 pp.

Response to Office Action dated Jan. 25, 2011, from U.S. Appl. No. 12/198,652, filed Mar. 25, 2011, 23 pp.

* cited by examiner

SERVICE AWARE PATH SELECTION WITH A NETWORK ACCELERATION DEVICE

TECHNICAL FIELD

The invention relates to computer networks and, more particularly, to network acceleration devices used within computer networks.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests to a single network server that overload or otherwise diminish the capacity of the network server to timely service the requested content. Moreover, network congestion and limited network bandwidth may impact client download speeds. To increase download speeds and reduce bandwidth consumption, a network administrator may deploy one or more intermediate network devices, referred to as network acceleration devices, located between the client devices and the servers. These intermediate network devices may apply one or more network acceleration services to network traffic passing between the client devices and the servers in order to address the above listed issues or other issues that adversely affect download speeds. In the respect, the intermediate network devices may optimize delivery of data to and from the client devices.

SUMMARY

In general, the invention is directed to service aware path selection within a network acceleration device. Moreover, the service aware path selection may allow the network service acceleration device to select between a plurality of paths based on latency characteristics associated with service devices positioned along each of the paths.

As one example, a first intermediate network acceleration device collects cost factors used in determining a cost for each of a plurality of paths between the first and a second intermediate network acceleration device. The cost factors may include cost factors related to optimization capabilities provided by other intermediate network acceleration devices along the plurality of paths. These optimization cost factors may offset other cost factors to reduce a total cost for the path on which these other intermediate network acceleration devices reside. The first intermediate network acceleration device may then select the least expensive or optimal path based, not only on conventional cost factors, but also on the cost factors related to optimization or service capabilities. In this manner, the first intermediate network device, rather than leave path selection to other network devices, e.g., routers, that are unaware of or do not consider optimization capabilities or services when performing path or next hop selection, may perform service "aware" path selection.

In operation, a network acceleration device may comprise a network interface by which to receive and forward the network traffic. The network acceleration device may also include a control unit coupled to the network interface. The control unit may include a path selection module that determines or collects various categories of cost factors, including link cost factors, adjacency cost factor and carrier cost factors. The link cost factors may refer to traditional cost factors, such as those determined by conventional network devices, e.g., routers. These traditional cost factors may include link latency and/or distance. The adjacency cost factors may refer to cost factors related to adjacent intermediate network acceleration devices. These adjacent cost factors may indicate a type of these adjacent intermediate network acceleration devices, optimization services made available by these adjacent intermediate network acceleration devices, a measured efficiency of these services, and a number of flows remaining within these adjacent intermediate network devices. The carrier cost factors may refer to cost factors concerning a carriers treatment of particular types of traffic.

The adjacent cost factors may, as they relate to optimization services, indicate the optimization capabilities made available to the intermediate network device, which therefore may offset the other link and carrier cost factors. The network acceleration device may determine these adjacent cost factors via communications in accordance with an adjacent communication protocol. The network acceleration device, may upon determining the cost factors for each path between a source and destination device, determine a cost for each of these paths based on at least the link and adjacent cost factors, where the adjacent cost factors may offset the link cost factors. The network acceleration device may then compare the costs computed for each path and select the least expensive path or the path corresponding to the lowest cost as the optimal path by which to forward a particular packet of the network traffic.

As the cost may vary with the adjacent cost factors related to optimization or service capabilities, the network acceleration device may perform a service "aware" path selection. The network acceleration device by selecting paths based not only on link cost factors but also on service or adjacent cost factors may forward traffic more efficiently by utilizing available services along each path to optimize the delivery of traffic when compared to standard path selection and forwarding performed by traditional network devices. That is, the network acceleration device may select one of a plurality of paths that provides services even though the selected path has a distance or other traditional link cost factor less beneficial to forwarding than another path. Upon selecting the path, to compensate for the greater distance cost factor, for example, the intermediate network device may apply services to leverage the intermediate optimization capabilities along the first path, and thereby forward the network traffic more efficiently.

In one embodiment, the invention is directed to a method comprising receiving, with a first intermediate network acceleration device, network traffic from a first network for delivery to a second network and determining, with the first intermediate network acceleration device, a first set of cost factors for a first path from the first intermediate network acceleration device to a second intermediate network acceleration device included within the second network, wherein the first set of cost factors include at least one optimization cost factor corresponding to intermediate optimization capabilities available to the first intermediate network acceleration device that offset other ones of the first set of cost factors. The method further comprising determining, with the first intermediate network acceleration device, a second set of cost factors for a second path from the first intermediate network acceleration device to the second intermediate network acceleration device, wherein the second path is different from the first path, selecting, with the intermediate network acceleration device, either the first path or the second path over which to forward the network traffic based on the first set of cost factors and the second set of cost factors, and forwarding, with the intermediate network acceleration device, the network traffic via the selected one of the first or second paths.

In another embodiment, the invention is directed to an intermediate network device comprising at least one network interface that receives network traffic from a first network for delivery to a second network, and a control unit that couples to the at least one network interface. The control unit comprises a storage medium that stores a first set of cost factors for a first path from the intermediate network device to another intermediate network device included within the second network, wherein the first set of cost factors include at least one optimization cost factor corresponding to intermediate optimization capabilities available to the intermediate network device that offset other ones of the first set of cost factors, and a second set of cost factors for a second path from the intermediate network device to the other intermediate network device, wherein the second path is different from the first path. The control unit further selects either the first path or the second path over which to forward the network traffic based on the first set of cost factors and the second set of cost factors and the at least one network interface forwards the network traffic via the selected one of the first or second paths.

In another embodiment, the invention is directed to a network system comprising a first network that includes at least one endpoint device, a second network that includes at least one device, a first intermediate network acceleration device adjacent to the first network, and a second intermediate network acceleration device adjacent to the second network. The first intermediate network acceleration device includes at least one network interface that receives network traffic from the first network for delivery to the second network and a control unit that couples to the at least one network interface. The control unit comprises a storage medium that stores a first set of cost factors for a first path from the first intermediate network acceleration device to the second intermediate network acceleration device, wherein the first set of cost factors include at least one optimization cost factor corresponding to intermediate optimization capabilities available to the first intermediate network acceleration device that offset other ones of the first set of cost factors, and a second set of cost factors for a second path from the first intermediate network acceleration device to the second intermediate network acceleration device, wherein the second path is different from the first path. The control unit further selects either the first path or the second path over which to forward the network traffic based on the first set of cost factors and the second set of cost factors and the at least one network interface forwards the network traffic via the selected one of the first or second paths.

In another embodiment, the invention is directed to a computer-readable medium comprising instructions for causing a programmable processor to receive, with a first intermediate network acceleration device, network traffic from a first network for delivery to a second network and determine, with the first intermediate network acceleration device, a first set of cost factors for a first path from the first intermediate network acceleration device to a second intermediate network acceleration device included within the second network, wherein the first set of cost factors include at least one optimization cost factor corresponding to intermediate optimization capabilities available to the first intermediate network acceleration device that offset other ones of the first set of cost factors. The computer-readable medium also comprising instructions for causing the programmable processor to determine, with the first intermediate network acceleration device, a second set of cost factors for a second path from the first intermediate network acceleration device to the second intermediate network acceleration device, wherein the second path is different from the first path, select, with the intermediate network acceleration device, either the first path or the second path over which to forward the network traffic based on the first set of cost factors and the second set of cost factors, and forward, with the intermediate network acceleration device, the network traffic via the selected one of the first or second paths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
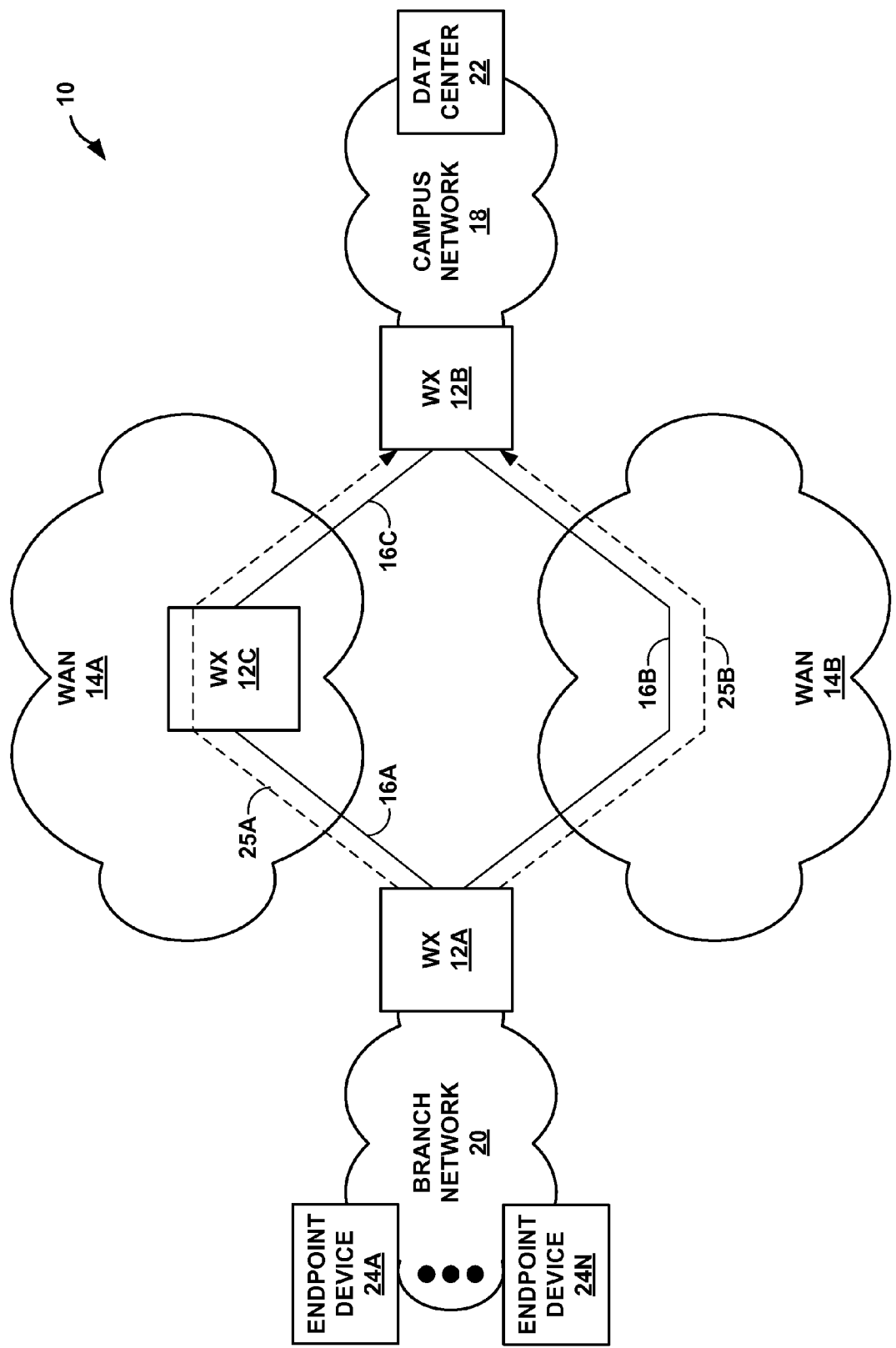
FIG. 1 is a block diagram illustrating an exemplary network system in which a wide area network acceleration (WX) device performs the service aware path selection techniques described herein.

FIG. 1 is a block diagram illustrating an exemplary network system 10 in which a wide area network acceleration device 12A performs the service aware path selection techniques described herein. While described in this disclosure with respect to a Wide Area Network (WAN) acceleration (X) device 12A ("WX 12A"), the techniques may be implemented by any intermediate network device that applies network acceleration services to network traffic to accelerate such traffic or otherwise improve performance of network system 10. For example, the techniques could be applied by WXs 12B, 12C instead of or in conjunction with WX 12A.

Moreover, although shown in FIG. 1 as a separate, stand-alone or independent device, WXs 12A-12C ("WXs 12") may each be incorporated within any other network device, including a router, a switch, a hub, a firewall, and an intrusion detection/prevention (IDP) device. The techniques therefore should not be limited to a WX but may be implemented by any intermediate network device. An intermediate network device may comprise any network device that resides between client or endpoint devices and servers or other network devices that store content, such as files, web pages, images, videos, data objects, etc.

As shown in FIG. 1, WXs 12A couples to each of Wide Area Networks 14A, 14B ("WANs 14") via links 16A, 16B, respectively. WX 12B also couples to each of WANs 14A, 14B via links 16C, 16B, respectively. WANs 14 may each comprise a public or private network that is available for lease or purchase by private entities or businesses so as to couple remote locations and/or networks together. For purposes of illustration, it is assumed that WAN 14A is owned and operated by one service provider, such as American Telephone and Telegraph (AT&T) Company, and WAN 14B is owned and operated by another service provider, such as Verizon Communications Inc.

Although not shown in FIG. 1 for ease of illustration purposes, WANs 14 may provide access to a public network, which may include any publicly accessible network, such as the Internet. Typically, the public network comprises a packet-based network that transmits packets according to an Internet Protocol (IP)/Transmission Control Protocol (TCP).

WX 12A resides at the edge of a remote or branch network 20. Likewise, WXs 12B resides at the edge of an enterprise or campus network 18. Branch network 20 may represent a small network used by a remote location or office of a large enterprise or business. Branch network 20 may comprise a local area network (LAN) that operates according to one of the family of Institute of Electrical and Electronics Engineers (IEEE) 802.X Ethernet standards. Campus network 18 may represent a larger network used by the main office or location of the large enterprise or business. Campus network 18 may also comprise a LAN that operates according to one of the family of IEEE 802.X Ethernet standards. Typically, data and other resources, such as templates, documents, manuals, accounting figures, employee information, applications, and any other information or application pertinent to operation of both the remote and main offices of the large enterprise, are stored in a centralized location.

Campus network 18 also includes a data center 22, which may provide a centralized location for the storage of the above described data, applications, and other resources. Data center 22 may represent a plurality of servers, which may each store in a centralized fashion the above described data, applications, and other resources. This data and other resources may be referred to herein generally as "content." That is, data center 22 may include one or more data servers, web servers, application servers, databases, computer clusters, mainframe computers, and any other type of server, computing element, and/or database commonly employed by an enterprise or business to facilitate the operation of the enterprise or business. These servers and/or databases may comprise "blades" or other cards that are inserted into large racks. The racks may provide a common backplane or switch fabric to interconnect the various servers and/or databases to one another, as well as, to campus network 18.

Data center 22 may support one or more of a variety of protocols or software interfaces by which these servers of data center 22 may serve the content. Exemplary protocols or software interfaces include a HyperText Transfer Protocol (HTTP), a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP).

By connecting to campus network 18, data center 22 may be accessible by any devices included within campus network 18 and any devices, e.g., one or more of a plurality of endpoint devices 24A-24N ("endpoint devices 24"), of branch network 20. Each of endpoint devices 24 may comprise a laptop computer, a desktop computer, a workstation, a mainframe computer, a personal digital assistant (PDA), a cellular phone, a smart phone, or any other device capable of accessing a network. Campus network 18 may provide such a centralized location for the storage of data, applications, or other computing resources to reduce costs associated with distributed data storage.

Distributed data storage architectures typically required each location to maintain its own separate database or server for use in storing data pertinent to each respective location. For example, assuming, for purposes of illustration, that campus and branch networks 18 and 20 implemented distributed data storage, branch network 20 may also have included a remote data center, e.g., servers similar to data center 22, for storing data and other resources or content pertinent to the operation of the branch office. In this distributed data storage example, data center 22 would usually only store and serve content pertinent to the operation of campus network 18.

As network infrastructure lies in both of networks 18 and 20, the enterprise or business may be required to have dedicated Information Technology (IT) staff at both the remote location, e.g., the branch office, and the main location, e.g., the main office, to service both the remote and central data centers, which may increase expenses. Even if no dedicated IT staff is provided for servicing the remote data center, the enterprise may be required to send IT staff to the remote location, e.g., branch network 20, to service the remote servers, which may increase costs and otherwise impinge upon the operation of the branch office. Moreover, issues, e.g., data loss, may arise when the data and other resource or, more generally, the content of branch network 20 needs to be synchronized with content stored to data center 22 of the main office or campus.

Centralized storage of the content, however, reduces, if not eliminates many of these issues by placing all of the equipment necessary for data storage within a centralized location that is easily accessible by a dedicated and centrally located IT staff. Furthermore, as a result of next generation Internet network acceleration services and web development, centrally located data center 22 may serve web-based applications that enable remote users to access data and other resources stored to data center 22 through a web-browser executed by each of endpoint devices 24. Because only a web-browser is required, branch offices may no longer require dedicated IT staff on site. Moreover, because content may be deployed remotely, the IT staff need not travel to the remote office. Again, by virtue of centralizing the content, IT costs may be significantly reduced. As a result, centralized data centers, such as those in which data centers 22 may each resides, are setting the standard by which large enterprises or businesses store and maintain data, as well as, remotely distribute new and update old applications.

While centralized storage of content may decrease costs, this centralized architecture typically requires that branch network 20 maintain access to campus network 18. Commonly, large enterprises or businesses may lease or purchase a dedicated line or connection that couples branch network 20 and campus network 18 together to ensure privacy or otherwise prevent unauthorized access to networks 18 and 20. A network service provider may lease or sell this line to the enterprise or business and usually charges various prices depending on the speed and/or bandwidth of the line. For example, a service provider may offer for lease a digital signal 1 ("DS1") or T-carrier 1 ("T1") line (e.g., a dedicated line having 1.536 mega-bits per second of bandwidth) for a first price per month and a DS3 or T3 line (e.g., a dedicated line having 44.736 mega-bits per second of bandwidth) for a second, higher price per month. Depending on the bandwidth required between branch network 20 and campus network 18, the enterprise or business may choose either to purchase one or more of either or both the T1 or T3 line.

For purposes of illustration, it is assumed that links 16A-16C ("links 16") are leased or purchased from one or more network service providers that own and operate WANs 14, e.g., the above mentioned AT&T and Verizon. Notably, the term "link" may used herein to refer to the physical connection (such as the cables or other communications mediums running between one or more central offices of WANs 14 and networks 18, 20), while "line" refers to a service (such as a T1 line or T3 line) carried by the link. Often, however, the terms are used interchangeably as a T1 or T3 line generally accompanies the leasing of one or more links. That is, a customer may request a T1 line service and, as part of that service, the service provider leases a dedicated link to the customer as part of providing the T1 line service. As a result, links 16 may also be referred to herein as "lines 16."

Considering that bandwidth concerns may, in part, control the selection of lines, the business or enterprise may attempt to reduce the bandwidth required between branch network 20 and campus network 18 in order to, again, reduce costs by enabling the enterprise to subscribe to a line that provides (and lease a link capable of supporting) less bandwidth. To this end, branch network 20 and campus network 18 may include one or more respective intermediate network devices, e.g., WXs 12A and 12B, to reduce bandwidth consumption through application of one or more network acceleration services to traffic traversing WANs 14.

Network acceleration services may include any action by WXs 12A, 12B to improve performance of network system 10, e.g., by reducing bandwidth consumption and thereby increasing available bandwidth. In other words, network acceleration services may include, for example, caching of content, compressing packets or other discrete data units of the network traffic, application acceleration, or any combination of the above, as well as, any other action that improves network performance. Example data compression network acceleration techniques are described in U.S. Pat. No. 7,167, 593, entitled "SYSTEM AND METHOD FOR INCREMENTAL AND CONTINUOUS DATA COMPRESSION", issued Jan. 23, 2007, incorporated herein by reference.

These intermediate network devices, e.g., WXs 12A, 12B, may represent proxy devices that divide each TCP or other protocol sessions into three discreet TCP session: (1) a first TCP session having terminations at an endpoint device 24 and WX 12A, (2) a second TCP session having terminations at WX 12A and WX 12B, for example, and (3) a third TCP session having terminations at WX 12B and data center 22. In this respect, WXs 12A, 12B may represent TCP proxies that apply network acceleration services to the second or intermediate TCP session. The various TCP sessions may therefore represent TCP tunnels between the various devices.

That is, endpoint device 24A may intend to establish a single TCP session with a particular destination, e.g., a server of data center 22, by which to access content stored to that destination. WX 12A may intercept this TCP session request and reply to the session as if WX 12A was the intended destination, thereby establishing the first TCP session or tunnel of the three. WX 12A may then establish a second or intermediate TCP session or tunnel with WX 12B, which may then establish a third TCP session or tunnel with data center 22. As a separate TCP session or tunnel exits between WXs 12A, 12B, these WXs 12A, 12B may apply network acceleration services to optimize delivery of data and traffic destined for and received from data center 22 without interfering with the first and second TCP sessions.

The intermediate network devices, e.g., WXs 12A, 12B, may, for example, locally cache content previously requested by a client device, such as one or more of endpoint devices 24, in order to optimize (or reduce if not eliminate) bandwidth consumption directed to subsequent requests for the same data. That is, WX 12A may, instead of issuing the request for the same content previously requested and thereby consuming bandwidth, cache the previously requested content and, without sending the request to data center 22 or the public network, service the request using the locally cached content, thereby preserving bandwidth.

The intermediate network devices, e.g., WXs 12A, 12B, may also communicate with one another via the second TCP session so as to optimize or compress traffic, and thereby reduce bandwidth consumption, by replacing identified sequences of data with, for example, symbols, where the symbols represent the respective identified sequences using fewer bits. Often, these compression services require pairs of WX devices, such as WXs 12A, 12B, where one compresses the traffic and the other un-compresses the traffic. WX 12A may, for example, apply a compression service that compresses the network traffic according to one of a plurality of compression algorithms, while WX 12B applies the same compression service to uncompress the traffic. Each of the plurality of compression algorithms may be tailored to a specific type of layer seven (L7) network application, e.g., a HyperText Transfer Protocol (HTTP) application, Skype, Telnet, FTP or a specific transport layer protocol (TCP) and each may represent a particular compression service. Consequently, different network acceleration devices (WXs 12) may apply different acceleration services for different types of network traffic.

WXs 12A, 12B may also apply an application-specific acceleration service having a particular algorithm designed to accelerate or optimize the retrieval of content for a specific network application. For example, an HTTP acceleration service may enable more efficient retrieval of HyperText Markup Language (HTML) pages. Typically, each HTML page comprises a plurality of objects, e.g., images, templates, Java Scripts, etc., and WX 12A may apply an HTTP acceleration service to each HTML request to more efficiently download the plurality of objects, thereby "accelerating" the retrieval of HTML pages requested via HTTP.

To determine an application to which each packet belongs, intermediate network devices 12A, 12B may classify each packet of the network traffic as belonging to a particular application and/or protocol and apply one or more corresponding network acceleration services (e.g., caching, compression, or application-specific acceleration) to improve network performance. In this manner, WXs 12A, 12B may apply network acceleration services to improve the performance of network system 10.

In the example of FIG. 1, WX 12A may communicate with WX 12B via one of a plurality of paths 25A, 25B ("paths 25") to apply network acceleration services. A "path," as used herein, may refer to one or more links, such as links 16, by which an intermediate network device may connect to another intermediate network device. For example, path 25B comprises a direct connection between WX 12A to WX 12B via link 16B. Path 25A comprises an indirect connection between WX 12A to WX 12B, as a third intermediate network acceleration device, e.g., WX 12C, lies along path 25A between WX 12A and WX 12B. Path 25A may be referred to as a "connecting path" in that path 25A comprises at least one connecting hop through a third intermediate network acceleration device 12C positioned between WXs 12A, 12B. Path 25A may also be referred to as an "indirect path" for similar reasons. Path 25B may be referred as a "direct path" in that WX 12A couples directly (e.g., without connecting or coupling to any intervening third network acceleration devices) to WX 12B.

That is, path 25A may represent a path through a WAN in which at least one intermediate network acceleration device capable of applying optimization or network acceleration services lies. Path 25A, for example, may comprise a path through WAN 14A in which WX 12A couples to WX 12C via link 16A and WX 12C couples to WX 12B via link 16C. As application of services may require pairs of WX devices, a path may comprise one or more pairs of WX devices, where each pair applies a different set of network optimization or acceleration services. Path 25A, for example, may comprise a first pair of intermediate network acceleration devices, e.g., WX 12A and WX 12C, applying a first set of services and a second pair of intermediate network acceleration devices, e.g., WX 12C and WX 12B, applying a second set of services. WX 12C may apply substantially similar set or different set of optimization or network acceleration services to those described above with respect to WXs 12A, 12B. While shown as only comprising a path having one connecting hop to a single intermediate network acceleration device or WX 12C, path 25A may comprise a plurality of connecting hops to a plurality of intermediate network acceleration devices similar to that of WX 12C, where each pair of intermediate network acceleration devices may apply one or more network optimization or acceleration services.

Path 25B, however, may represent a path through a WAN, or other network, in which a first network acceleration device and a second intermediate network device directly couple to one another without any other intermediate network acceleration device lying along the path. That is, path 25B may, as shown in the example of FIG. 1, comprise a path through WAN 14B in which WX 12A couples to WX 12B directly via link 16B. While shown as comprising a single link, path 25B may comprise any number of links so long as none of those links route through an intermediate network acceleration device similar to that of WX 12C capable of providing network acceleration services, otherwise, path 25B may not be representative of a "direct" path.

In accordance with the techniques described herein, a first intermediate network acceleration device, e.g., WX 12A, may, for example, perform service-aware path selection in accordance with the techniques described herein to select one of a plurality of paths, e.g., paths 25, that represents an optimal (e.g., least expensive) connection with a second intermediate network acceleration device, e.g., WX 12B. For example, a first WX 12A may receive network traffic from a first network (or branch network 20) for delivery to a second network (or campus network 18). WX 12A may then determine a first set of cost factors for a first path 25A from the first intermediate network acceleration device (or WX 12A) to a second intermediate network acceleration device (or WX 12B) included within campus network 18.

"Cost factors" refer to factors that an intermediate network acceleration device, such as WX 12A, may utilize when determining a cost associated with each of a plurality of paths. Typical cost factors include a distance between WXs 12A, 12B (e.g., a number of next hops), a latency of one or more links along the path, and the like. "Cost factors," as used herein, however may also include non-conventional cost factors, such as cost factors related to intermediate optimization capabilities available to the first intermediate network acceleration device (or WX 12A) that offset other ones of the first set of cost factors, such as the typical latency or distance cost factors. These cost factors concerning intermediate optimization capabilities may be offered by those intermediate network acceleration devices, such as WX 12C, that lie along connecting or indirect paths, such as path 25A. The first intermediate network acceleration device (or WX 12A) may automatically discover (i.e., learn) of these intermediate optimization capabilities, as described below in more detail, and determine to what extent these optimization capabilities may offset the more traditional cost factors.

Example cost factors may include the above mentioned typical link-based cost factors, such as the latency and distance cost factors, an available bandwidth cost factor, an average Transmission Control Protocol (TCP) window size of the any connections on a given link, and a number of TCP connections already using the given link. A latency cost factor typically represents a time required to receive a reply to a request via the associated path and is expressed as a unit of time, such as milliseconds (ms). The distance cost factor refers to the number of hops of the associated path required to reach the destination and is typically expressed as an integer number. For example, path 25A comprises two hops from WX 12A to WX 12B (e.g., one hop from WX 12A to WX 12C via link 16A and another hop from WX 12C to WX 12B via link 16C), while path 25B comprises one hop from WX 12A to WX 12B via link 16B. The available bandwidth cost factor may refer to an amount of bandwidth available over each link forming the associated path and is expressed as an amount of data per time unit, such as MegaBytes per second (MBs/s).

Non-conventional cost factors related to intermediate optimization capabilities may be divided into two categories, adjacency cost factors and carrier cost factors. Adjacency cost factors may comprise cost factors related to adjacent intermediate network acceleration devices, such as WX 12B, 12C, which are adjacent to or one hop from WX 12A. Example adjacency cost factors may include cost factors concerning a type of each adjacent WX, services made available by each adjacent WX, an efficacy or efficiency for each service offered by each adjacent WX, a number of WX devices along a given path, and licensing information. Carrier cost factors may comprise cost factors related to a particular carrier, e.g., the above mentioned AT&T and Verizon. Various carriers may give preferential treatment to one type of traffic over another, such as preferring HTTP traffic over VoIP traffic. Carrier cost factors may include cost factors related to carrier treatment of different types of traffic (a carrier treatment cost factor), link lease agreements with the carrier, etc.

WX 12A may, after determining the first set of cost factors for the first path or path 25A, determine a second set of cost factors for a second path, e.g., path 25B, from the first intermediate network acceleration device (or WX 12A) to the second intermediate network acceleration device (or WX 12B), where this second path 25B is different from the first path or path 25A in any number of ways. Notably, in the example of FIG. 1, path 25B comprises a direct path through a second WAN 14B that includes only a single pair of intermediate network acceleration devices, while path 25A comprises a connecting path that includes more than one pair of intermediate network acceleration devices. As no intermediate network acceleration devices similar to WX 12C lie along path 25B, WX 12A may only offsetting cost factors related to services offered by WX 12B for path 25B. WX 12A may then select either path 25A or path 25B over which to forward the network traffic based on the first set of cost factors and the second set of cost factors.

In other words, WX 12A may calculate a cost for each of paths 25 and select the optimal path (e.g., the one of the plurality of paths 25 for which WX 12A computed a lowest cost) over which to route the received traffic. WX 12A may compute a sub-cost for each pair of successive WX devices along a given path. For example, WX 12A may, for path 25A, compute a first sub-cost for WX pair 12A, 12C based on cost factors collected for link 16A and services offered by WX 12C and a second sub-cost for WX pair 12C, 12B based on cost factors related to link 16C and services offered by WXs 12C and 12B. WX 12A may then average or perform some other mathematical operation to compute a cost for path 25A based on the plurality of sub-costs computed for each successive pair of WX devices. For direct paths, the sub-cost may equal the cost and WX 12A may not perform any additional mathematical operations to compute a cost from sub-costs for these direct paths.

WX 12A may, in some instance, compute the cost for each of the plurality of paths 25 by, in part, calculating a weighted average of the first and second sets of cost factors, respectively. WX 12A may, as described in below in more detail, employ different weights based on a type of the traffic received so as to select an optimal one of paths 25 based not only on services made available to WX 12A by those intermediate network devices positioned between WX 12A and WX 12B (e.g., WX 12C) but also on the type of traffic. In this manner, by varying the weights, WX 12A may compute an application-specific cost that favors particular aspects or characteristics of the application to which the traffic is associated. WX 12A, may for example, favor (by, for example, assigning a higher weight to) a latency cost factor for Voice over Internet Protocol (VoIP) applications while favoring (by, for example, assigning a higher weight to) an offsetting optimization cost factor for an email application.

WX 12A may perform various mathematical operations to normalize different cost factors used in computing the weighted average. WX 12 may, for example, perform various mathematical operations such that a change in latency impacts the cost as much as an equal change in bandwidth. WX 12A may further normalize different cost factors to reflect how each cost factor is represented numerically. For example, a latency cost factor is generally represented in terms of time, such as milliseconds (ms). A lower latency is typically better than a higher latency in terms of data delivery. Another cost factor, such as available bandwidth, may be represented inversely to the latency cost factor. That is, a higher available bandwidth may be better than a lower available bandwidth in terms of data delivery. WX 12A may therefore normalize the available bandwidth cost factor (as cost varies similar to latency in that a lower cost is better than a higher cost) by computing the inverse of the available bandwidth cost factor, where a lower inversed available cost factor is typically better than a higher inversed available bandwidth cost factor. In this manner, WX 12A may compute a cost for each of the plurality of paths 25 based on the weighted average of sets of cost factors determined for each of the plurality of paths 25.

WX 12A may select the optimal one of paths 25 by selecting the path with the lowest cost. WX 12A may iterate through each of the plurality of paths 25 and compare the costs associated with each of the plurality of paths 25 to one another, continually noting the current lowest cost. Upon finding a cost associated with one of paths 25 lower than the current lowest cost, WX 12A may replace the current lowest cost with the even lower cost associated with the one of paths 25. In this manner, WX 12A may, after comparing all of the costs associated with all of the plurality of paths 25 between WX 12A and WX 12B, select one of paths 25 representing the optimal or lowest cost path.

In some instances, WX 12A may select an optimal one of paths 25 that comprises a distance or latency cost factor greater than another one of paths 25 as a result of the offsetting cost factors described above. For example, WX 12A may select path 25A, which comprises a distance cost factor of two (or tow hops: one from WX 12A to WX 12C and one from WX 12C to WX 12B) over path 25B which comprises a distance cost factor of one (or one hop from WX 12A directly to WX 12B). WX 12A may select path 25A despite this higher distance cost factor as a result of an offsetting service provided by WX 12C that more than offsets the higher distance and thereby lowers the cost associated with path 25A under the cost associated with path 25B.

Upon selecting an indirect or offsetting path, WX 12A may establish a session with WX 12C in order to utilize the offsetting services. WX 12A may communicate with WX 12C identifying the traffic to which WX 12A requests application of services provided by WX 12C. The communication may also identify the services to apply to this identified traffic, as well as, the destination of the traffic. Furthermore, the communication may request that WX 12C apply services so as to optimize the delivery of the traffic to WX 12B. In this manner, a first intermediate network device, WX 12A, may establish a session with a third intermediate network device, WX 12C, in order to optimize the delivery of the traffic to a second intermediate network device, WX 12B, and offset those other of the cost factors used in calculating the cost. In other words, WX 12A may divide the second TCP session described above into two sub-sessions, one from WX 12A to WX 12C and another from WX 12C to WX 12B. On each separate leg or sub-session of the second TCP session, WXs 12 may apply optimization services that offset other of the first set of cost factors determined for path 25A.

WX 12A may then forward the traffic via the selected one of first path 25A or second path 25B. If WX 12A selects a connecting path or path 25A, for example, WX 12A may establish the session with WX 12C (and thereby sub-divide the second TCP session) and forward the traffic to WX 12C via the first sub-divided TCP session. By so specifying that WX 12C is the destination of the traffic, WX 12A prevents other network devices, such as routers, from selecting a path and routing the traffic to WX 12B in a manner that does not consider the optimization capabilities of an intermediate network device positioned between WX 12A and WX 12B, e.g., WX 12C.

If WX 12A selects direct path 25B, WX 12A may merely specify WX 12B as the destination, and other network devices, e.g., the routers, may perform path selection. In some instances, these other network devices may route the traffic along path 25A, however, as WX 12A has not established the session nor communicated with WX 12C. In this instance, WX 12C may merely forward the traffic to WX 12B without applying any optimization or network acceleration services to the traffic. In this respect, WX 12A only enforces its path selection when intermediate network acceleration devices, such as WX 12C lie along the selected one of the plurality of paths. Otherwise, WX 12A allows other network devices, such as routers, to select the optimal path considering only typical cost factors, such as distance or latency. These typical cost factors may be characterized as relying solely on link characteristics. When selecting the optimal path, WX 12A may compute the cost based not only typical link based cost factors but also on service based cost factors and therefore WX 12A may perform service "aware" path selection to select an optimal one of a plurality of paths 25 in accordance with the principles of the invention.

Figure 2:
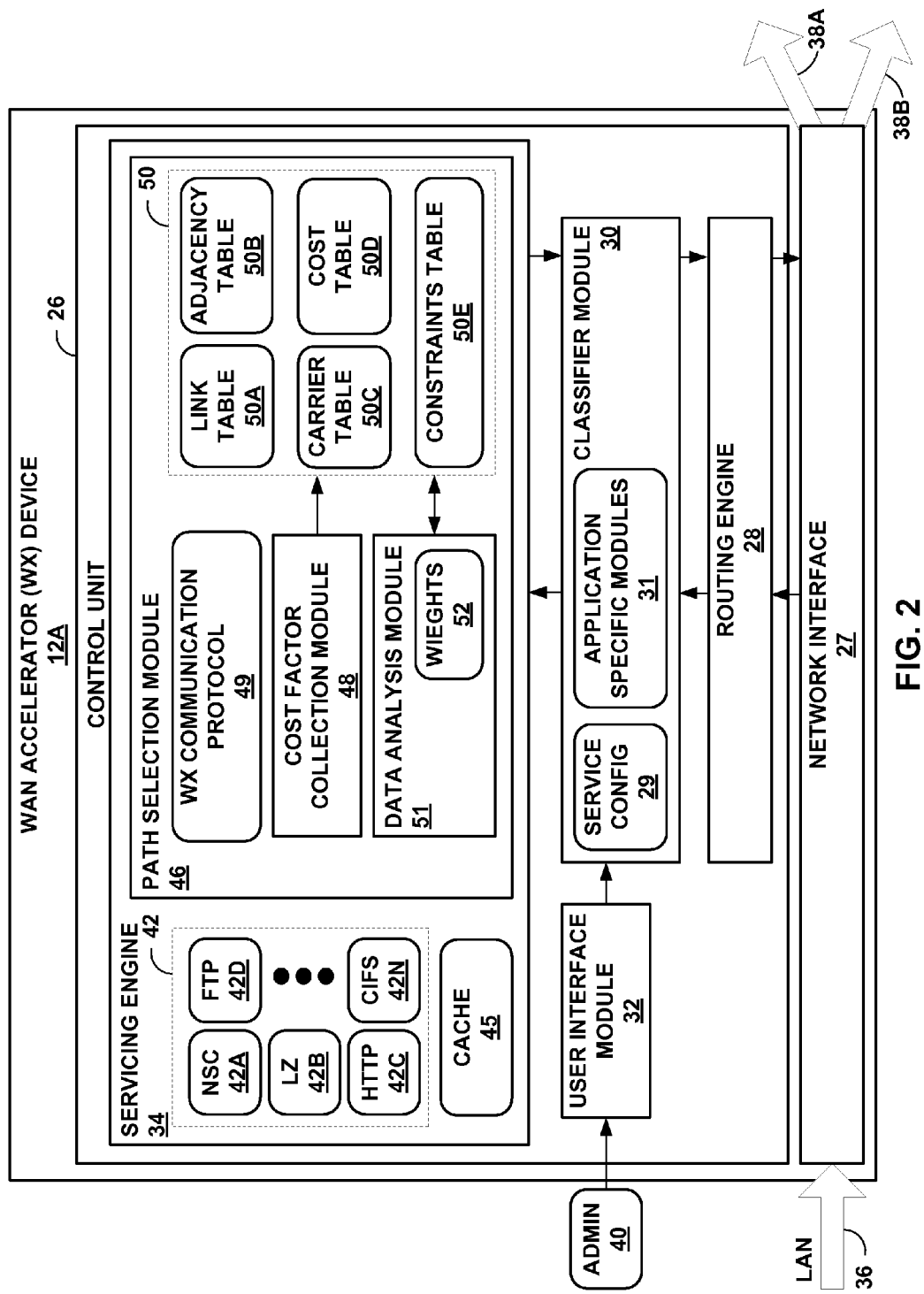
FIG. 2 is a block diagram illustrating one embodiment of the WX device of FIG. 1 in more detail.

FIG. 2 is a block diagram illustrating WX device 12A of FIG. 1 in more detail. As shown in FIG. 2, WX 12A includes a control unit 26 and at least one network interface 27, wherein control unit 26 couples to network interface 27. Control unit 26 may include one or more processors (not shown in FIG. 2) that execute software instructions stored to a computer-readable storage medium (not shown in FIG. 2), such as a disk drive, optical drive, Flash memory or any other type of volatile or non-volatile memory, that cause a programmable processor, such as control unit 26, to perform the techniques described herein. In some embodiments, control unit 26 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Network interface 27 represents any interface by which WX 12A may send and receive network traffic or LAN traffic 36 and other information. Network interface 27 may, in some instances, comprise an interface card or any other removable card for sending and receiving traffic 36. In other instances, network interface 27 may comprise one or more of an Ethernet port, a serial port, a Universal System Bus (USB) port, a Firewire port, or any other port by which data may be sent and received.

Control unit 26 may include a routing engine module 28 ("routing engine 28"), a classifier module 30, a user interface module 32 and a servicing engine module 34 ("servicing engine 34"). Routing engine 28 represents a module comprising hardware and/or software to receive incoming large area network (LAN) traffic 36 from branch network 20 via one or more network interfaces, such as network interface 27, process or otherwise route LAN traffic 36 and forward LAN traffic 36 via network interface 27 via either of WANs 14 as WAN traffic 38A, 38B, respectively. It is assumed for purposes of illustration that WAN traffic 38A is forwarded to WAN 14A via link 16A of path 25A and WAN traffic 38B is forward to WAN 14B via link 16B of path 25B.

Classifier module 30 represents a module comprising hardware and/or software to receive packets from a network, such as branch network 20, and classify those packets based on information contained within a header, a payload, or both the header and the payload of the packet. Classifier module 30 may determine, based on this information, to which of a plurality of flows, session, connection and/or application each of the packets of LAN traffic 36 corresponds.

Classifier module 30 may determine to which flow a particular one of packets of LAN traffic 36 corresponds by extracting information referred to as a "five-tuple" from each packet. Each flow represents a flow of packets in one direction within the network traffic. A five-tuple comprises a source Internet Protocol (IP) address, a destination IP address, a source port, a destination port, and a protocol. Typically, the five-tuple is found within the header of each of the packets of LAN traffic 36 and classifier module 30 may parse or otherwise extract the five-tuple from the header of each of these packets to identify to which flow each of the packets corresponds. Classifier module 30 may also extract and utilize additional information to identify a flow, such as a source media access control ("MAC") address and a destination MAC address.

Classifier module 30 may also, based on this information, identify an application-specific protocol or application to which each of the packets of LAN traffic 36 corresponds. Classifier module 30 may, for example, determine, based on a source port of the five-tuple, whether each packet of LAN traffic 36 corresponds to an HTTP application, e.g., a web browser. In particular, classifier module 30 may include application specific modules 31 that determine to which type of application each packet of LAN traffic 36 is associated. Application specific modules 31 may comprise, for example, a HyperText Transfer Protocol (HTTP) module that inspects each packet to determine whether each packet comprises a HTTP packet, a File Transfer Protocol (FTP) module that inspects each packet to determine whether each packet comprises a FTP packet, etc.

Classifier module 30 may also maintain a service configuration 29 ("service config 29"), where service configuration 29 represents data, rules or other information that defines associations among network acceleration services, such as the below described services 42, and a flow, a session, a connection, an application, a protocol, a port, a path or other classifiable characteristic of network traffic 36. In this respect, service configuration 29 may comprise one or more rules that define associations between network acceleration services and one or more identifiable characteristic of network traffic 36, such as a port number.

User interface module 32 represents a module that presents one or more user interfaces by which an administrator, such as administrator 40 ("admin 40"), may interact to configure WX 12A. Servicing engine 34 represents a module for processing or servicing packets of LAN traffic 36. Processing, in the context of WX 12A, refers to servicing packets of LAN traffic 36 by responding to each of packet of LAN traffic 36 with an appropriate response. For example, one packet of LAN traffic 36 may request content from campus network 20, and servicing engine 34 may process this packet by retrieving this content from a memory local to WX 12A, e.g., a cache 45, or directly from campus network 20 and responding to the packet with the retrieved content. Servicing of a packet may also refer to servicing engine 34 compressing the packet such that the compressed version of the packet may be sent to WX 12B to reduce the consumption of bandwidth over links 16 and WANs 14. Servicing may also refer to the above described application acceleration. Servicing of a packet may therefore generally refer to the application of one or more network acceleration services to LAN traffic 36.

Servicing engine 34 includes a plurality of network acceleration services 42A-42N ("network acceleration services 42"), a cache 45 and a path selection module 46. Network acceleration services 42 include a number of different network acceleration services, such as Non-uniform Spectral Compression (NSC) service 42A ("NSC 42A"), a Lempel-Ziv (LZ) compression service 42B ("LZ 42B"), a HyperText Transfer Protocol (HTTP) acceleration service 42C ("HTTP 42C"), a File Transfer Protocol (FTP) acceleration service 42D ("FTP 42D"), and a Common Internet File System (CIFS) acceleration service ("CIFS 42N").

Cache 45 represents one or more memories, either static or dynamic, that stores content retrieved from remote locations. Cache 45 may be employed by servicing engine 34 to provide the above described caching service. Path selection module 46 represents a module for implementing, at least in part, the service aware path selection aspect of the techniques described herein. That is, path selection module 46 may represent a module that selects an optimal bath based not only on standard cost factors but also on cost factors concerning intermediate optimization capabilities. To this end, path selection module includes a cost factor collection module 48, a plurality of tables 50 and a data analysis module 51.

Cost factor collection module 48 may collect cost factors, both standard or link-based and non-conventional or service-based, as well as, any other cost factor measurable by WX 12A, such as the above described carrier-based cost factors. Tables 50 may comprise a link table 50A, an adjacency table 50B, a carrier table 50C, a cost table 50D and a constraints table 50E for storing data or other information concerning cost factors. Although not shown in FIG. 2, control unit 26 may comprise a storage medium, e.g., a memory, or a storage device, e.g., a hard drive, that stores one or more of tables 50.

Moreover, while shown as separate tables 50, each of tables 50 may be included within a single table or any other data structure and the invention should not be limited to the example shown in FIG. 2. Based on information stored to tables 50, data analysis module 51 may determine the cost associated with each of the plurality of paths 25.

Initially, admin 40 may interact with a user interface presented by user interface module 32 to configure WX 12A. Admin 40 may provide input via the user interface to define service configuration 29 and thereafter update, alter, or otherwise edit the above described service configuration 29. Admin 40 may, for example, input an association via a user interface presented by user interface module 40 that associates HTTP acceleration service 42C with a particular port, e.g., port 80. User interface module 40 may receive this input and update service configuration 29 according to the input. In this manner, admin 40 may interact with user interface module 32 to define service configuration 29 in order to configure WX 12A. Once configured, WX 12A may operate according to the service aware path selection techniques to select an optimal path to a given destination.

For example, routing engine 28 may receive LAN traffic 36 via one or more of the plurality of interfaces, whereupon routing engine 28 may forward LAN traffic 36 to classifier module 30. Classifier module 30 may classify each packet of LAN traffic 36 by identifying to which flow, session, connection, application, protocol, and/or other identifiable classification type each packet of LAN traffic 36 corresponds. Classifier module 30 may employ one or more protocol and/or application specific modules 31 to identify particular types of applications or protocols to which each packet of traffic 36 belongs.

Classifier module 30 may then perform a lookup of service configuration 29 using one or more of the identified characteristics (or so-called "classification information") as a key to determine whether any rules exists with respect to that packet within service configuration 29. If no rule exists, classifier module 30 may return that packet back to routing engine 28 for forwarding via one of links 16. If a rule exists, classifier module 30 may forward each classified packet, as well as, the identifying information including the type of application to which each packet belongs, and the corresponding one or more rules to servicing engine 34.

Servicing engine 34 may receive each packet, the identifying information and the rules and apply those network acceleration services 42 identified by the corresponding rules. After servicing each packet of LAN traffic 36, servicing engine 34 may forward the packet to classifier module 30, which in turn forwards each packet to routing engine 28. Routing engine 28 may then forward each packet via the plurality of interfaces to either of WANs 14 as respective WAN traffic 38A, 38B ("WAN traffic 38").

Throughout or simultaneous to the application of network acceleration services 42, cost factor collection module 48 collects information concerning cost factors pertinent to selecting a path. Cost factor collection module 48 may collect the above described cost factors, both typical and non-conventional. For example, cost factor collection module 48 may collect information for each link concerning that link's latency and available bandwidth. To determine latency, cost factor collection module 48 may monitor packets sent over a link to an adjacent WX device, such as WXs 12B, 12C, and determine a time necessary to receive a response to each packet. Cost factor collection module 48 may then subtract the time the packet was sent from the time the response arrived to determine a latency for each of links 16A, 16B, for example. Cost factor collection module 48 may determine an available bandwidth by monitoring both incoming and outing traffic sent via each link per unit of time and subtract this calculated bandwidth from a total bandwidth value, thereby determining available bandwidth. The total bandwidth may be established as a constant through a service contract with the carrier and cost factor collection module 48 may learn of this total bandwidth upon establishing the first connection over each of links 16A, 16B.

Cost factor collection module 48 may also collect information concerning cost factors related to optimization capabilities of adjacent intermediate network acceleration devices, e.g., WXs 12B, 12C. The optimization cost factors may offset the standard link cost factors, as described below in more detail. Optimization cost factors may also be referred to as "service cost factors," as optimization occurs via application of services. Cost factor collection module 48 may employ a WX communication protocol 49 to collect the service cost factors. WX communication protocol 49 may comprise a protocol for communicating with other intermediate network devices, such as WX 12B, 12C. Cost factor collection module 48 may transmit communications in accordance with WX communications protocol 49 to alert adjacent WXs 12B, 12C of changes to services provided by WX 12A, as well as, other state information pertinent to cooperating with WXs 12B, 12C in order to apply services, and thereby optimize, WAN traffic 38.

Likewise, cost factor collection module 48 may receive communications in accordance with WX communication protocol 49 from adjacent intermediate network acceleration devices 12B, 12C that indicate statuses of these WXs 12B, 12C. Each of these communications may identify a type of the corresponding one of WXs 12B, 12C, such as a product identifier or device identifier, services supported or made available by the corresponding one of WXs 12B, 12C, and licensing information or number of flows serviceable by the corresponding one of WXs 12B, 12C.

Cost factor collection module 48 may also monitor those of services 42 applied by servicing engine 34 to each of WAN traffic 38 to determine an efficiency with which those services optimize traffic. For example, cost factor collection module 48 may calculate a compression ratio of applying a compression service, such as LZ 42B, to traffic destined for either of adjacent WXs 12B, 12C. These service efficiency cost factors may be utilized in determining the extent to which the corresponding optimization cost factors offset the link cost factors discussed above.

Cost factor collection module 48 may further determine carrier cost factors, such as carrier latency per type of application (or a "carrier treatment cost factor") and a carrier charged price per unit of data transmitted or data rate. Cost factor collection module 48 may dynamically determine carrier latency per application type through monitoring of WAN traffic 38. Admin 40 may statically configure the data rate described above or cost factor collection module 48 may learn of the data rate upon establishing a first connection via each of WANs 14.

As described above, cost factor collection module 48 may store the above collected cost factors or results to one or more of tables 50. Cost factor collection module 48 may store the cost factors as a function of time, and therefore each entry of each of tables 50 may store historical data describing each cost factor at an instance in time. Therefore, tables 50 may, in some instances, store historical data pertaining to cost factors of links 16, adjacent WXs 12B, 12C and carriers over time.

Link table 50A may for example comprise at least one link entry that stores historical information for each of links 16. Cost factor collection module 48 may maintain link table 50A with link-based cost factors, such as latency and available bandwidth. Link table 50A may comprise a plurality of link entries, each link entry defined by a destination IP address associated with an adjacent WX device, such as WXs 12B, 12C, and storing the above described link cost factors monitored on a per link basis. The following Table 1 illustrates an exemplary configuration of a link table 50A:

TABLE 1

| Link Destination IP Address | Latency (ms) | Available Bandwidth (MB) |
|---|---|---|
| 192.168.100.1 (WX 12B) | 7.3 | 303.2 |
|  | 10.4 | 201.3 |
| 192.168.100.8 (WX 12C) | 14.35 | 146.9 |
|  | 15.45 | 90.4 |

As shown above, the first link coupling WX 12A to WX 12B, i.e., link 16B, which is assigned IP address of 192.168.100.1, has a single link entry storing historical data related to two cost factors, e.g., a latency cost factor and an available bandwidth cost factor. For each cost factor, two historical data points have been stored. For example, latency has increased from 7.3 ms to 10.4 ms, and an available bandwidth has decreased from 303.2 MB to 201.3 MB.

For the second link coupling WX 12A to WX 12B, i.e., link 16C, which is assigned an IP address of 192.168.100.8, another link entry exists storing two cost factors, e.g., the latency and available bandwidth cost factors. Again, for each cost factor, two historical data points have been stored. For example, latency has increased from 14.35 ms to 15.45 ms, and an available bandwidth has decreased from 146.9 MB to 90.4 MB. The above Table 1 is illustrative of one exemplary embodiment of a client table 50A and should not be construed as limiting to the techniques described herein. Moreover, for ease of illustration purposes, Table 1 is shown above in simplified form and may comprise any number of link cost factors normally employed in standard or conventional path selection algorithms.

Adjacency table 40B may comprise an adjacency entry that stores historical data or information for each adjacent intermediate network device, e.g., WXs 12B, 12C, with which WX 12A connects to apply joint network acceleration services. Each adjacency entry may be associated with an IP address assigned to that one of WXs 12B, 12C and store the above described cost factors collected on a per adjacency basis. The following Table 2 illustrates an exemplary configuration of an adjacency table 50B:

TABLE 2

| Adjacency | Type | Services Available | Service Efficiency | No. Connections Remaining |
|---|---|---|---|---|
| 192.168.100.1 (WX 12B) | WX 900 | HTTP, NSC, FTP | 31%, 43%, 19% | 224 |
|  |  | HTTP, NSC | 8%, 25% | 40 |
| 192.168.100.8 (WX 12C) | WX 1200 | HTTP, CIFS, NSC | 17%, 39%, 47% | 433 |

As shown above, the adjacent intermediate network device assigned IP address 192.168.100.1, e.g., WX 12B, has a single adjacency entry storing historical data related to four cost factors, e.g., a WX type or type, network acceleration services, service efficiency and licensing information or number (no.) of connections remaining For each cost factor, two historical data points have been stored, except for the type cost factor.

For example, cost factor collection module 48 determined a type cost factor for WX 12B as "WX 900" and a services available cost factor that indicates WX 12B supports, at a first point in time, HTTP acceleration, NSC compression and FTP acceleration network acceleration services and, at a second point in time, only the HTTP compression and NSC acceleration network acceleration services. Moreover, for each of these services, cost factor collection module 48 determined a service efficiency cost factor that indicates the HTTP, NSC and FTP services are 31%, 43% and 19% efficient, respectively, in optimizing the corresponding traffic, at the first point in time, and the HTTP and NSC servicers are 8% and 25% efficient, respectively, at the second point in time. Cost factor collection module 48 may also determine the number of connections remaining or available under the current license has decreased from 224 to 40. The above Table 2 is illustrative of one exemplary embodiment of an adjacency table 50B and should not be construed as limiting to the techniques described herein. Moreover, for ease of illustration purposes, Table 2 is shown in simplified form and may comprise any number of adjacency cost factors related to any of the above described optimization cost factors collected on a per adjacency, e.g., WXs 12B, 12C, basis.

Carrier table 50C may for example comprise a carrier entry that stores historical information for each carrier, e.g., WANs 14. Each carrier (or link) entry may be associated with a particular interface of WX 12A (not shown in FIG. 2) used to interface with a particular one of links 16 owned by respective WANs 14 and store the above described carrier cost factors monitored on a per carrier or link basis. The following Table 3 illustrates an exemplary configuration of a carrier table 50C:

TABLE 3

| Carrier | Type of Traffic | Latency |
|---|---|---|
| Interface 1 (WAN 14A) | HTTP, FTP, CIFS | 10.7 ms, 15.3 ms, 19.4 ms |
| Interface 2 (WAN 14B) | HTTP, FTP | 11.1 ms, 12.6 ms |

As shown above, each carrier entry stores a type of traffic sent via the carrier and a latency each type of traffic incurs as it traverses the carrier. As interfaces generally couple to a single link, each interface represents a link and one or more of interfaces may be summed to determine per carrier metrics. For each carrier cost factor, one historical data point has been stored. For example, the first interface or "Interface 1" connecting to WAN 14A treats the following types of traffic, HTTP, FTP and CIFS, by forwarding HTTP traffic with a latency of 10.7 ms, FTP traffic with a latency of 15.3 and CIFS traffic with a latency of 19.4. Table 3 is illustrative of one exemplary embodiment of a carrier table 50C and should not be construed as limiting to the techniques described herein. Moreover, for ease of illustration purposes, Table 3 is shown in simplified form and may comprise any number of carrier cost factors related to any of the above described cost factors monitored on a per carrier basis.

Based on these cost factors stored to tables 50, data analysis module 51 may analyze tables 50 to compute a cost for each of paths 25. Data analysis module 51 may compute the above described sub-costs for each successive pair of WXs along the path. Data analysis module 51 may, in some instances, compute the cost for each path by calculating a weighted average, as described above, of the cost factors collected for each path and stored to tables 50. Data analysis module 51 may maintain weights 52 for use in calculating the weighted average. In some instances, data analysis module 51 may maintain different sets of weights 52 for different types of applications associated with each packet of LAN traffic 36. Data analysis module 51 may receive the type of application from classification module 30 and use a set of weights 52 associated with the received type of application to calculate a weighted average of cost factors stored to tables 50 for each of paths 25.

For example, data analysis module 51 may receive a packet and identifying information classifying the packet as associated with an HTTP application from classifier module 30. Data analysis module 51 may then retrieve a first set of cost factors associated with a first path, e.g., path 25A. As path 25A traverses link 16A and couples to an adjacent WX 12C, data analysis module 51 may access link table 50A and adjacency table 50B to retrieve link and adjacency entries associated with link 16A and WX 12C or a first successive pair of WXs 12A, 12C, respectively. In some instances, data analysis module 51 may retrieve a link entry that includes a latency cost factor from link table 50A, which, for purposes of illustration, may indicate a latency of 15.45, as shown in the above Table 1.

Data analysis module 51 may further determine whether WX 12C supports an HTTP service based on the retrieved adjacency entry. Assuming for purposes of illustration exemplary Table 2 represents table 50B, data analysis module 51 determines that WX 12C supports an HTTP service and determines the efficiency of the HTTP service. Again, assuming Table 2 represents table 50B for purposes of illustration, data analysis module 51 determines that the HTTP service made available by WX 12C is 17% efficient at compressing HTTP traffic. In this manner, data analysis module 51 may access adjacency table 50B to determine optimization or service cost factors for an intermediate WX device positioned between WX 12A and WX 12B, e.g., WX 12C.

Data analysis module 51 may next access carrier table 50C to determine carrier cost factors representing, for example, how the carrier of WAN 14A prioritizes or treats HTTP traffic. Data analysis module 51 may determine that WAN 14A and therefore interface 1 is the interface by which traffic may be forwarded along path 25A and access carrier table 50C to retrieve the carrier entry associated with WAN 14A. Data analysis module 51 may determine from the associated carrier entry how WAN 14A treats HTTP traffic. Assuming, again, for purposes of illustration, that Table 3 represents carrier table 50C, data analysis module 51 may determine that WAN 14A, and therefore the carrier of WAN 14A, forwards HTTP traffic with a latency of 10.7 ms.

After determining these cost factors for path 25A, data analysis module 51 may normalize these cost factors in the manner described above. Data analysis module 51 may then select a set of weights 52 corresponding to the type of application for which the packet was classified as belonging. Data analysis module 51 may then compute a cost for path 25A by calculating the weighted average of the cost factors determined for path 25A from tables 50. In some instance, cost factors associated with optimization capabilities may comprise a negative one of weight 52 such that these factors offset the values of the other cost factors when calculating the weighted average. Alternatively, these cost factors associated with optimization capabilities may be negated prior to calculating the weighted average. Regardless of the manner in which the cost is calculated, the cost factors associated with optimization capabilities may offset other cost factors.

Given the above cost factors, e.g., a link latency of 15.45, a service efficiency of 17, and a carrier application latency of 10.7, for an HTTP packet, data analysis module 51 may determines weights of 10, −8 and 7, and calculate a weighted average of $((15.45*10)+(17*-8)+(10.7*7))/3$, which equals approximately 31.1. In some instances, data analysis module 51 may computes the inverse of one or more of cost factor so as to normalize the cost factors in the manner described above. In other words, latency cost factors vary inversely to the benefit in terms of forwarding data, while available bandwidth varies directly with the benefit in terms of forwarding data. Better stated, a lower latency is typically better for forwarding data than a higher latency, while a higher available bandwidth is typically better for forwarding data than a lower available bandwidth. To normalize these contrarian cost factors, data analysis module 51 may compute the inverse of available bandwidth, thereby inverting the relationship with the benefit.

To further complicate matters, cost factors related to optimization capabilities may only be inverted when the benefit varies in proportion with the value of the cost factor. For example, service efficiency varies in proportion or directly with the benefit, yet data analysis module 51 may not compute the inverse of this optimization cost factor, as this cost factor offsets other cost factors. Therefore, a higher value for these cost factors reduces the cost and it generally follows that a greater benefit should reduce the cost more than a lower benefit. As a result, data analysis module 51 may employ complex algorithms for normalizing or otherwise adjusting cost factors used in computing the weighted average.

Data analysis module 51 may compute a cost (or, in this instance, sub-cost), in a manner similar to the calculation of the cost for link 16A, for link 16C from WX 12C to WX 12B and average or perform some other mathematical operation (e.g., weighted average) on the two sub-costs to determine a cost or total cost for path 25A. That is, data analysis module 51 may compute a second sub-cost for the second successive pair of WXs 12C, 12B of path 25A similar to computing the first sub-cost for the first successive pair of WXs 12A, 12C of path 25A.

Assuming data analysis module 51 computes a sub-cost for this second link as approximately 29.4, data analysis module 51 may compute a cost or total cost of $(29.4+31.1)/2$ or 30.25 for path 25A. Data analysis module 51 may compute a cost in this manner for each of the plurality of paths 25. To illustrate, data analysis module 51 may compute a weighted average for path 25B using the same weights as above with a link latency cost factor of 10.4, an HTTP service efficiency cost factor of 8 and a carrier application latency cost factor of 11.1 according to above Tables 1, 2 and 3. Data analysis module 51 may therefore compute a weighted average of $((10.4*10)+(8*-8)+(7*11.1))/3$, which equals approximately 39.2.

Data analysis module 51 may then store these sub-cost and/or costs to cost table 50D, which may comprise a plurality of cost entries. Typically, each of the plurality of cost entries of cost table 50D stores a cost or sub-cost for each pair of WX devices. From these cost entries, data analysis module 51 may reconstruct a cost or total cost for each path. Data analysis module 51 may store a plurality of costs or sub-costs for each path, as different costs or sub-costs may be calculated for the same path. In other words, each of the plurality of cost entries may store a plurality of costs or sub-costs for each pair of WX devices and data analysis module 51 may select the appropriate cost or sub-cost to use in calculating a cost for a path based on the type of application. For example, a single path may transmit HTTP traffic at a different cost than FTP traffic, and data analysis module 51 may store both costs to cost table 50D and access the appropriate cost using the type of application identified by classifier module 30. Cost table 50D may also or alternatively store costs for each path instead of sub-costs for each pair of WX devices.

By maintaining cost table 50D, data analysis module 51 may only compute a cost or sub-cost for each pair of WX devices upon first sending traffic along a given path. Alternatively, data analysis module 51 may compute a sub-cost for each pair of WX devices at set intervals, such as once every second, minute, hour, day or any other interval of time so as to reduce consumption of system resources. In some instances, data analysis module 51 may monitor system resources, such as processor utilization, and only compute a sub-cost for each pair of successive WX devices when sufficient system resources are available. In other instances, data analysis module 51 may compute a sub-cost for each pair of WX devices in response to detecting a change in a given pair of WX devices, such as an addition of an optimization service as indicated by a communication in accordance with WX communication protocol 49. Regardless of when sub-costs are computed, by storing costs to cost table 50D, data analysis module 51 may not need to re-compute costs or sub-costs for every packet of LAN traffic 36 but may instead perform a lookup in cost table 50D.

In some instances, data analysis module 51 may only compute sub-costs for pairs of WX devices that meet particular constraints. For example, data analysis module 51 may determine the above cost factors for a packet associated with a particular type of application, such as a VoIP application. VoIP applications generally require a low latency, as VoIP customers typically do not tolerate interruptions to conversations. Data analysis module 51 may therefore access a constraints table 50E that defines a plurality of constraint entries, each entry defining constraints for a particular type of application. Data analysis module 51 may access constraints table 50E using the type of application as a key to retrieve, in this instance, the VoIP constraints. One example VoIP constraint may indicate that latency must be less than 11 ms.

Data analysis module 51 may compare this VoIP latency constraint to the link latency and, for any link or pair of successive WX devices along the path violating this constraint, reject the path without further computing a cost for this path. In some instances, data analysis module 51 may perform mathematical operations in order to sum, average, or otherwise compute a total cost factor for a given path and compare the constraint to this total cost factor. Based on the comparison, data analysis module 51 may reject a given path. In this manner, data analysis module 51 may immediately reject paths without having to compute costs or sub-costs for each path or successive pair of WX devices and thereby improve the speed with which path selection module 46 may select a path. In effect, path selection module 46 may, by incorporating constraints into the selection of an optimum one of paths 25, implement a form of constraint-based routing or path selection.

After computing costs for all paths (or those paths that meet constraints defined in constraints table 50E) between a given source WX device, e.g., WX 12A, and a given destination WX device, e.g., WX 12B, path selection module 46 may select an optimal one of paths 25 by traversing cost table 50D. As described above, an optimal path may comprise a path with the lowest cost or that is least expensive. Path selection module 46, continuing the example above, may select path 25A, as path 25A is associated with a cost of 30.25 while path 25B is associated with a cost of 39.2. Path selection module 46 may then determine whether the determined optimal one of paths 25 requires WX 12A to interact with an intermediate WX device positioned between WX 12A and WX 12B, e.g., WX 12C.

Assuming path 25A is selected as the optimal one of paths 25, path selection module 46 determines that WX 12C lies along path 25A and that HTTP service 42C should be applied to the packet of LAN traffic 36. Path selection module 46 may communicate with WX 12C via WX communication protocol 49 to establish a session with WX 12C, whereby WX 12A and WX 12C cooperate to apply HTTP service 42C to the packet of outgoing WAN traffic 38A. The communication with WX 12C may further indicate that WX 12C forward the packet to WX 12B and possibly that WX 12C apply some other service supported by both of WX 12C and WX 12B. Path selection module 46 may then indicate that servicing engine 34 apply HTTP service 42C to the packet and update the packet such that the destination IP address indicates the IP address assigned to WX 12C.

Servicing engine 34, after performing these operations, may forward the packet to classifier module 30, which in turn forwards the packet to routing engine 28. Routing engine 28 may then forward the packet via network interface 27 as WAN traffic 38A. The packet may then be received by WX 12C which, due to the previous communication from WX 12A, establishes a service with WX 12B by which to efficiently compress the packet, applies the indicated service, and forwards the packet to WX 12B. WX 12B may receive the packet and deliver the packet to data center 22 which may respond, whereupon WX 12B may perform similar operations to that of WX 12A to transmit the packet back to WX 12A via one of paths 25. WX 12B may determine that a different one of paths 25 is optimal for delivering traffic to WX 12A and may, therefore, forward the response via path 25B, for example. As a result, path selection may be flow-specific, where one flow of a session is routed via a first path and a corresponding flow of the session is routed via a second path.

In this manner, WX 12A may select an optimal path by computing costs based not only on link cost factors but also on service cost factors, and possibly, even carrier cost factors. WX 12A may then sub-divide the second TCP session by establishing, via communications in accordance with WX communication protocol 49, a forwarding structure. In this respect, classifier module 30 may maintain within service configuration 29 rules that indicate which services to apply and an IP address of the next hop along the selected optimum path, both of which may be defined by the communication. In the example above, WX 12C may comprise a rule in a service configuration similar to service configuration 29 that indicates that WX 12C should apply an HTTP service to any packets corresponding to a particular flow and forward those packets to WX 12B via link 16C. WX 12A may therefore override standard path selection performed by other network device, such as routers, that may not consider service or other non-conventional cost factors when selecting a path. As a result, WX 12A may more efficiently delivery traffic to its destination, thereby reducing network inefficiencies.

WX 12A may, by way of establishing a path through the network, perform a type of switching usually performed by link-state protocols, such as a Multiprotocol Label Switching protocol. While the computation of costs is described herein on a per path basis similar to that of link-state protocols, WX 12A may calculate costs on a per link basis or any other basis typically used to compute costs. If computed on a per link basis, path selection module 46 may implement a form of next-hop routing, where each WX 12 selects the least expensive link (or the link associated with the lowest cost calculated in accordance with the techniques described herein) as opposed to the least expensive path.

Figure 3:
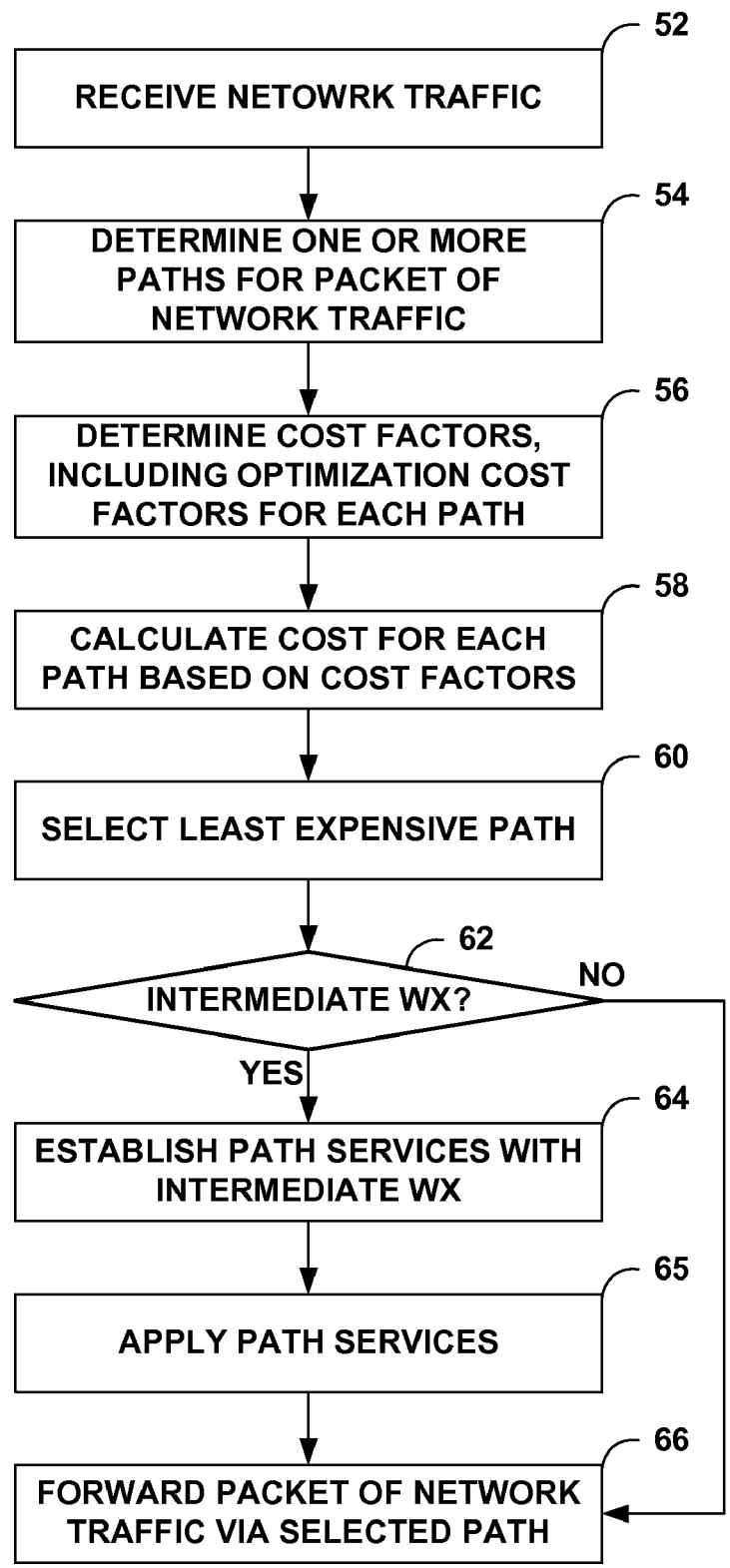
FIG. 3 is a flowchart illustrating an example operation of the WX device of FIG. 2 in performing the service aware path selection techniques described herein.

FIG. 3 is a flowchart illustrating an example operation of WX 12A of FIG. 2 in performing the service aware path selection techniques. While described with respect to WX 12A, any one of WXs 12 may implement the service aware path selection techniques. The service aware path selection techniques therefore should not be limited to WX 12A.

Initially, WX 12A may receive network traffic 36 (52). In particular, network interface 27 may receive traffic 36 and forward this traffic to routing engine 26. Routing engine 26 may forward each packet of traffic 36 to classifier module 30, which may determine any rules that apply to that packet based on service configuration 29 and classify the packet as belonging to a particular application by applying application specific modules 31, as described above. Upon classifying the packet, classifier module 30 may, as described above, forward the packet and any corresponding classification information, including the application to which the packet belongs, to servicing engine 34.

Servicing engine 34 may determine one or more paths for the packet of network traffic 36 (54). In particular, path selection module 46 may determine one or more paths by which the packet may reach a destination identified by the packet. That is, the packet may include a destination IP address identifying the destination for which the packet is destined. Path selection module 46 may maintain, in adjacency table 50B, one or more destination IP addresses reachable by each adjacent intermediate network acceleration devices. For example, an entry corresponding to WX 12B may include a list of destination IP addresses identifying those IP addresses or range of IP addresses, e.g., IP subnet, assigned to campus network 18. Path selection module 46 may therefore parse the destination IP address from the packet and compare this destination IP address to the destination IP addresses stored to each entry of adjacency table 50B. In some instances, path selection module 46 may maintain an index or other data structure to facilitate this look-up of table 50B, where the index organizes the entries of table 50B by destination IP address.

For connecting or indirect paths, path selection module 46 may identify these paths in a multistage process. For example, by accessing table 50B, path selection module 46 may first identify WX 12B, by way of an IP address assigned to WX 12B, as the intermediate network acceleration device closest or adjacent to the destination, assuming the destination lies within campus network 18, such as data center 22. Path selection module 46 may then work backwards and identify any other intermediate network acceleration devices 12 that list the IP address assigned to WX 12B as a destination in the corresponding entry of table 50B. In this instance, WX 12C may identify WX 12B, by the IP address assigned to WX 12B, in an entry of table 50B corresponding to WX 12C. From these two look-ups, where each look-up may represent a stage in the multistage process, path selection module 46 may identify path 25A by working backwards from path 25B.

In any event, after determining each of the plurality of paths 25, cost factor collection module 48 of path selection module 46 may determine or collect cost factors, including the above described optimization or service cost factors where available, for each of the plurality of paths 25 (56). For example, cost factor collection module 48 may determine a first set of cost factors for path 25A and a second set of cost factors for path 25B. As path 25A includes WX 12C that provides or makes available services, cost factor collection module 48 may collect or determine not only standard cost factors but also optimization cost factors related to those services WX 12C make available to WX 12A. As path 25B, however, does not include any intervening intermediate network acceleration devices similar to WX 12C, cost factor collection module 48 may collect standard cost factors. Notably, for both of paths 25, cost factor collection module 48 may collect carrier cost factors, as described above.

After collecting these cost factors and storing these cost factors to tables 50A-50C, data analysis module 51 of path selection module 46 may, as also described above, calculate or compute a cost for each of the plurality of paths 25 based on the cost factors stored to tables 50A-50C (58). In some instances, data analysis module 51 computes the cost for each of paths 25 by calculating a weighted average according to weights 52. Data analysis module 51 may, for example, determine a set of weights 52 by which to calculate the weighted average based on the type of application to which the packet belongs.

As described above, data analysis module 51 may also only determine a cost for those of paths 25 that meet application-specific or other constraints stored to constraints table 50E. Additionally, data analysis module 51 may store these costs to cost table 50D for use in selecting between paths at a later time. This, as described above, may facilitate path selection by enabling data analysis module 51 to avoid re-computing a cost each time a packet for a given destination is received by WX 12A.

After computing a cost for each of paths 25 (or those of paths 25 that meet constraints specified in constraints table 50E), data analysis module 51 may select the least expensive or lowest cost one of paths 25 as the optimal one of paths 25 by which to forward the packet (60). Path selection module 46 may then determine whether the path includes an intermediate or third WX, such as WX 12C, that lies between the intermediate network acceleration device adjacent to the source identified by the source IP address of the packet, e.g., WX 12A, and the intermediate network acceleration device adjacent to the destination identified by the destination IP address of the packet, e.g., WX 12B (62).

If, as in the example described above, path selection module 46 selects a connecting or indirect path, such as path 25A, path selection module 46 may establish via a communication in accordance with WX communication protocol 49 path services with intermediate WX 12C, as described above ("YES" 62, 64). "Path service" refer to those services applied by an intermediate network acceleration device, such as WX 12C, that lies along the path between the intermediate network acceleration device closest or adjacent to the source, e.g., WX 12A, and the intermediate network acceleration device closest or adjacent to the destination, e.g., WX 12B. These path services may represent the source of the optimization or service cost factors that offset or otherwise negate the other cost factors. However, for these path services to negate the other cost factors, WX 12A typically must establish a session by which WXs 12A and 12C cooperate to apply these path services via the communication in accordance with WX communication protocol 49. The communication may also identify the services and next hop, e.g., WX 12B, for packets received via this session, as described above. Servicing engine 34 may then apply at least one path services, e.g., one or more of services 42, to the packet and forward the packet of network traffic 36 via the selected path, e.g., path 25A, to WX 12C, which may forward the packet, after possibly applying the indicated services, to WX 12B, as described above.

Alternatively, if path selection module 46 selects a direct path, such as path 25B, path selection module 46 may need to establish any path services as no intermediate network acceleration device lies along the path to provide these path services ("NO" 62). Instead, path selection module 46 may establish services along path 25B directly between WX 12A and 12B. Servicing engine 34 may apply these direct services, such as one or more of services 42, and forward the packet of network traffic 36 via the selected path, e.g., path 25B (66).

In this manner, WX 12A may select an optimal path based not only on standard cost factors related to link characteristics but also on services available along each path. In the above example, WX 12A may select either a connecting path 25A or a direct path 25B. Both of paths 25 may provide services, however, in some instances, the cost factors related to the path services provided by WX 12C along path 25A may offset the other cost factors, such as the distance cost factor. Therefore, despite that path 25A comprises a distance cost factor twice that of path 25B, for example, path selection module 46 may select path 25A if the optimization cost factors related to the path services offset this other distance cost factor. As a result, WX 12A may perform service aware path selection in that path selection depends not only on conventional link-based cost factors but also on services, contrary to conventional network devices that merely select routes by which to route traffic based on these conventional link-based cost factors.

Figure 4:
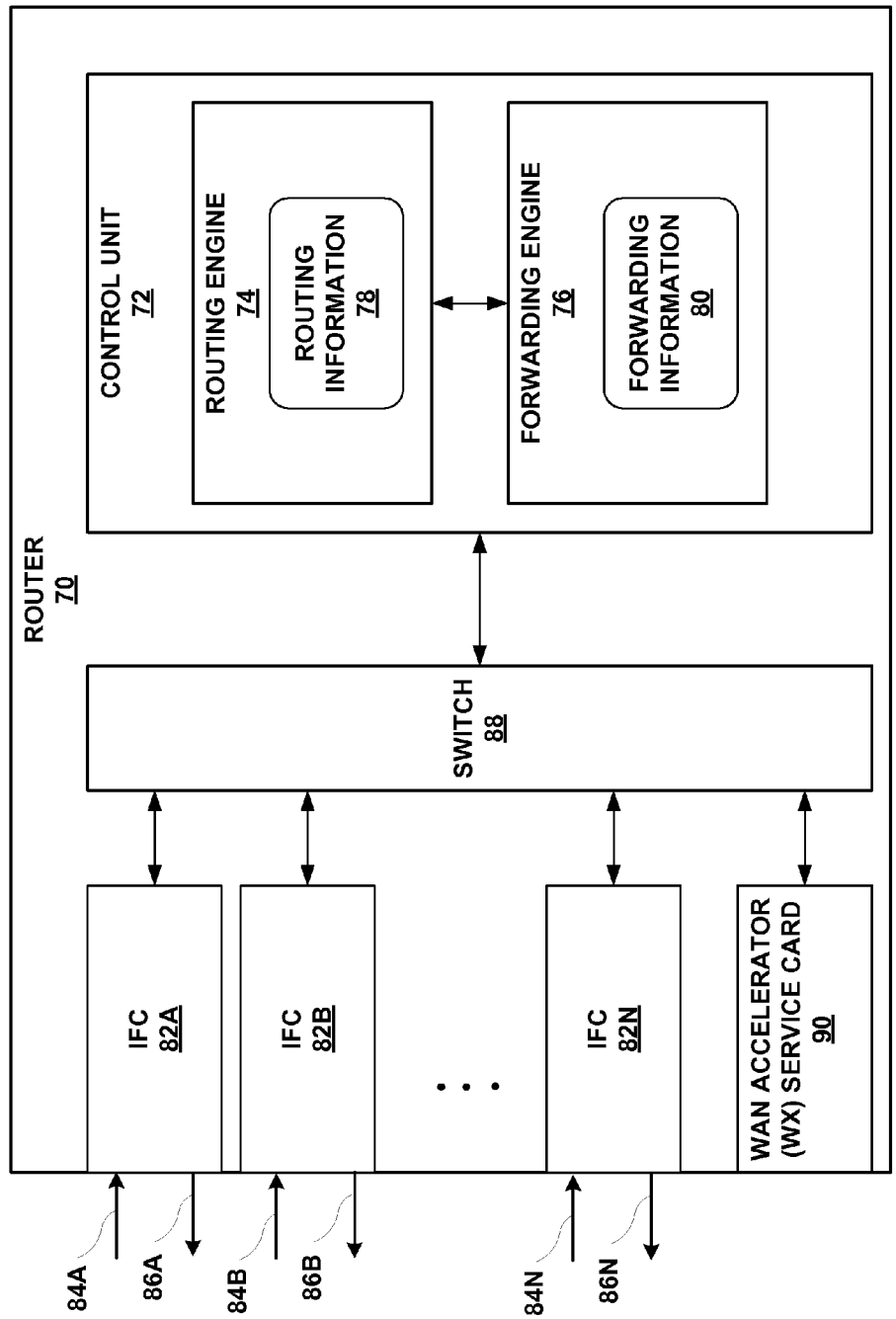
FIG. 4 is a block diagram illustrating a router that performs service aware path selection in accordance with the principles of the invention described herein.

FIG. 4 is a block diagram illustrating a router 70 that performs service aware path selection in accordance with the principles of the invention described herein. Although described with respect to router 70, any network device, such as a hub, switch, et cetera may implement the techniques described herein and the principles of the invention should not be limited to this exemplary embodiment.

As shown in FIG. 4, router 70 includes a control unit 72 that comprises a routing engine 74 and a forwarding engine 76. Routing engine 74 is primarily responsible for maintaining routing information 78 to reflect the current topology of a network and other network entities to which it is connected. In particular, routing engine 74 updates routing information 78 to accurately reflect the topology of the network and other entities. In accordance with routing information 78, forwarding engine 76 maintains forwarding information 80 that associates network destinations with specific next hops and corresponding interfaces ports.

Router 70 includes a set of interface cards (IFCs) 82A-82N ("IFCs 82") for communicating packets via inbound links 84A-84N ("inbound links 84") and outbound links 86A-86N ("outbound links 86"). Each of IFCs 82 couple to and communicate with control unit 72 via switch 88. Switch 88 may comprise any communication medium capable of communicatively coupling one or more endpoints, e.g., IFCs 82, control unit 72, and Wide Area Network (WAN) accelerator (X) service card 90. Forwarding engine 76 may receive packet forwarded via switch 88 from IFCs 82 and forward those packets via switch 88 and IFCs 82 on outbound links 86 according to forwarding information 80. In this manner, forwarding engine 76 provides the forwarding functionality of router 70.

Router 70 also includes a wide area network (WAN) accelerator (X) service card 90 ("WX service card 90"). WX service card 90 may be substantially similar to any one of WXs 12 in that WX service card 90 may include a control unit that comprises substantially the same user interface, classifier module, servicing engine (including path selection module, etc.) as that of WX 12A, as shown in the example of FIG. 2. In this respect, WX service card 90 may perform the techniques described above with respect to WX 12A in substantially the same manner as that of WX 12A.

WX service card 90 may however not include a routing engine similar to that of client WX 12A as control unit 72 may perform the routing functions. In this regard, WX service card 90 may differ from WX 12A described above. That is, router 70 may receive the packets via incoming links 84, whereupon IFCs 82 forward those packets via switch 88 to forwarding engine 76. Forwarding engine 76 may maintain information requiring that packets associated with particular flows, as one example, should be first sent to WX service card 90 prior to forwarding those packets via one of outbound links 86.

Forwarding engine 76 may then forward these packets to WX service card 90 for processing or servicing in the manner described above. These packets may, therefore, arrive similar to LAN traffic 36 however these packets may be received directly by classifier module 30, in this instance. WX service card 90 may also select paths according to the service aware path selection techniques described herein.

That is, WX service card 90, despite being incorporated in a conventional routing device, e.g., router 70, may continue to employ the service aware path selection techniques described herein, as these techniques may be transparent to forwarding engine 76. The techniques may be transparent in that WX service card 90 re-addresses the packet as part of the subdivision of the second TCP session, as described above.

For example, assuming WX service card 90 represents WX 12A of FIG. 1 and selects path 25A, WX service card 90, upon receiving a packet destined for data center 22, replaces the destination IP address specified in the header of the packet with an IP address assigned to WX 12C as part of the subdivision process. WX service card 90 may then communicate, via a communication in accordance with the WX communication protocol, that the destination IP address originally provided in the packet header replace those assigned to any WX 12 prior to forwarding the packet to campus network 18. Forwarding engine 76, therefore, may only receive packets destined for a particular destination, which in the example above comprises WX 12C, and forwards the packet to this destination in accordance with forwarding information 80. As a result, WX service card 90 may establish and maintain the second TCP session and any subdivisions thereof so as to route, forward, or otherwise redirect traffic in a manner transparent to router 70.

WX service card 90 may therefore comprise any card or other removable processing unit or circuit that may be inserted into a slot. WX service card 90 may, once inserted into the slot, interface with switch 88, whereby WX service card 90 may receive, service and forward packets in accordance with the principles of the invention. In this manner, any network device may implement the techniques described herein to improve the efficiency with which network traffic is processed. Various embodiments of the invention have been described. These and other embodiments are within the scope of the following claims.

The invention claimed is:

1. A method comprising:
    receiving, with a first intermediate network acceleration device, network traffic from a first network for delivery to a second network;
    receiving, with the first intermediate network acceleration device, a first communication from a second intermediate network acceleration device indicating intermediate optimization capabilities made available by the second intermediate network acceleration device;
    receiving, with the first intermediate network acceleration device, a second communication from a third intermediate network acceleration device included in the second network indicating direct optimization capabilities made available by the third intermediate network acceleration device;
    determining, with the first intermediate network acceleration device, a first set of cost factors for a first path from the first intermediate network acceleration device to the third intermediate network acceleration device, wherein the first set of cost factors include at least one optimization cost factor corresponding to the intermediate optimization capabilities made available to the first intermediate network acceleration device by the second intermediate network acceleration device positioned between the first intermediate network acceleration device and the third intermediate network acceleration device along the first path;

determining, with the first intermediate network acceleration device, a second set of cost factors for a second path from the first intermediate network acceleration device to the third intermediate network acceleration device, wherein the second set of cost factors includes at least one direct optimization cost factor corresponding to the direct optimization capabilities made available to the first intermediate network acceleration device by the third intermediate network acceleration device, and wherein the second path comprises a direct path from the first intermediate network acceleration device to the third intermediate network acceleration device that does not include any other intermediate network acceleration devices;

selecting, with the first intermediate network acceleration device, either the first path or the second path over which to forward the network traffic based on the first set of cost factors and the second set of cost factors; and forwarding, with the first intermediate network acceleration device, the network traffic via the selected one of the first or second paths.

2. The method of claim 1, wherein selecting either the first path or the second path comprises:

calculating a first cost for the first path based on the first set of cost factors for the first path, wherein the at least one optimization cost factor corresponding to one or more of the intermediate optimization capabilities made available to the first intermediate network device offset other ones of the first set of cost factors to reduce the first cost;

calculating a second cost for the second path based on the second set of cost factors for the second path;

comparing the first and second costs to determine a least expensive path from the first path and the second path; and selecting the determined least expensive path over which to forward the network traffic.

3. The method of claim 2, further comprising determining a type of layer seven network application to which each packet the network traffic belongs, wherein calculating the first and second costs each comprise calculating a weighted average of the respective first and second sets of cost factors, wherein at least one of a plurality of weights used in computing the weighted average vary by the type of application to which each of the packets of the network traffic belong.

4. The method of claim 1, further comprising:

determining a type of layer seven network application to which the network traffic is associated, wherein selecting either the first path or the second path comprises:

determining at least one application constraint associated with the determined type of application; and selecting either the first path or the second path further based on the determined at least one application constraint.

5. The method of claim 1, wherein determining the first set of cost factors comprises determining link cost factors and adjacency cost factors, wherein the link cost factors include one or more of a latency cost factor and a distance cost factor, and wherein the adjacency cost factors include one or more of a type cost factor that indicates a type of adjacent intermediate network acceleration device, a services available cost factor that indicates services made available by the adjacent network acceleration device, and a flows remaining cost factor that indicates a number of flows remaining in the adjacent network acceleration device.

6. The method of claim 5, wherein determining the first set of cost factors further comprises carrier cost factors that include one or more of a data rate cost factor that indicates a rate charged per unit of data and a carrier treatment cost factor that indicates a latency for packets corresponding to a particular type of application.

7. The method of claim 1, wherein forwarding the network traffic comprises establishing a session with the second intermediate network acceleration device positioned between the first and third intermediate network acceleration devices in order to apply one or more services to the network traffic that correspond to the intermediate optimization capabilities made available to the first intermediate network acceleration device;

applying the one or more services in accordance with the session prior to forwarding the traffic via the first path; and forwarding the network traffic via the first path.

8. The method of claim 1, wherein a total cost associated with the first path is based on the first set of cost factors, wherein cost factors of the first set of cost factors other than the at least one optimization cost factor increase the total cost associated with the first path, and wherein the at least one optimization cost factor reduces the total cost associated with the first path.

9. A first intermediate network acceleration device comprising:

at least one network interface that receives network traffic from a first network for delivery to a second network, receives a first communication from a second intermediate network acceleration device indicating intermediate optimization capabilities made available by the second intermediate network acceleration device, and receives a second communication from a third intermediate network acceleration device included in the second network indicating direct optimization capabilities made available by the third intermediate network acceleration device; and a control unit that couples to the at least one network interface, the control unit comprising a storage medium that stores a first set of cost factors for a first path from the first intermediate network acceleration device to a third intermediate network acceleration device included within the second network, wherein the first set of cost factors include at least one optimization cost factor corresponding to the intermediate optimization capabilities made available to the first intermediate network acceleration device by the second intermediate network acceleration device positioned between the first intermediate network acceleration device and the third intermediate network acceleration device along the first path, and a second set of cost factors for a second path from the first intermediate network device to the third intermediate network device, wherein the second set of cost factors includes at least one direct optimization cost factor corresponding to the direct optimization capabilities made directly available to the first intermediate network acceleration device by the third intermediate network acceleration device, wherein the second path comprises a direct path from the first intermediate network acceleration device to the third intermediate network acceleration device that does not include any other intermediate network acceleration devices, wherein the control unit selects either the first path or the second path over which to forward the network traffic based on the first set of cost factors and the second set of cost factors, and wherein the at least one network interface forwards the network traffic via the selected one of the first or second paths.

10. The first intermediate network acceleration device of claim 9, wherein the control unit comprises a path selection module that calculates a first cost for the first path based on the first set of cost factors for the first path, calculates a second cost for the second path based on the second set of cost factors for the second path, compares the first and second costs to determine a least expensive path from the first path and the second path and selects the determined least expensive path over which to forward the network traffic, wherein the at least one optimization cost factor corresponding to the intermediate optimization capabilities made available to the first intermediate network acceleration device offset other ones of the first set of cost factors to reduce the first cost.

11. The first intermediate network acceleration device of claim 10, wherein the control unit further comprises a classifier module that determines a type of layer seven network application to which each packet the network traffic belongs, wherein the path selection module comprises a data analysis module that calculates a weighted average of the respective first and second sets of cost factors, wherein at least one of a plurality of weights used in computing the weighted average vary by the type of application to which each of the packets of the network traffic belong.

12. The first intermediate network acceleration device of claim 9, wherein the control unit comprises:

a classifier module that determines a type of layer seven network application to which the network traffic is associated, a path selection module that determines at least one application constraint associated with the determined type of application, and selects either the first path or the second path further based on the determined at least one application constraint.

13. The first intermediate network acceleration device of claim 9, wherein the first set of cost factors comprise link cost factors and adjacency cost factors, wherein the link cost factors include one or more of a latency cost factor and a distance cost factor, and wherein the adjacency cost factors include one or more of a type cost factor that indicates a type of adjacent intermediate network acceleration device, a services available cost factor that indicates services made available by the adjacent network acceleration device, and a flows remaining cost factor that indicates a number of flows remaining in the adjacent network acceleration device.

14. The first intermediate network acceleration device of claim 13, wherein the first set of cost factors further comprise carrier cost factors that include one or more of a data rate cost factor that indicates a rate charged per unit of data and a carrier treatment cost factor that indicates a latency for packets corresponding to a particular type of application.

15. The first intermediate network acceleration device of claim 9, wherein the first intermediate network device comprises a Wide Area Network (WAN) Acceleration (X) device.

16. The first intermediate network acceleration device of claim 9, wherein the control unit further includes:

a path selection module that establishes a session with the second intermediate network acceleration device in order to apply one or more services to the network traffic that correspond to the intermediate optimization capabilities made available to the first intermediate network acceleration device by the second intermediate network acceleration device; and a servicing engine that applies the one or more services in accordance with the session prior to forwarding the traffic via the first path in order to optimize the network traffic, and wherein the network interface forwards the optimized network traffic via the first path.

17. The first intermediate network acceleration device of claim 9, wherein a total cost associated with the first path is based on the first set of cost factors, wherein cost factors of the first set of cost factors other than the at least one optimization cost factor increase the total cost associated with the first path, and wherein the at least one optimization cost factor reduces the total cost associated with the first path.

18. A network system comprising:

a first network that includes at least one endpoint device;

a second network that includes at least one device;

a first intermediate network acceleration device adjacent to the first network;

a second intermediate network acceleration device adjacent to the second network; and a third intermediate network acceleration device positioned between the first intermediate network acceleration device and the second intermediate network acceleration device along a first path from the first intermediate network acceleration device and the second intermediate network acceleration device, wherein the first intermediate network acceleration device includes:

at least one network interface that receives network traffic from the first network for delivery to the second network, a first communication from the third intermediate network acceleration device indicating intermediate optimization capabilities made available by the third intermediate network acceleration device, and a second communication from the second intermediate network acceleration device indicating direct optimization capabilities made available by the second intermediate network acceleration device; and a control unit that couples to the at least one network interface, the control unit comprising a storage medium that stores a first set of cost factors for a first path from the first intermediate network acceleration device to the second intermediate network acceleration device, wherein the first set of cost factors include at least one optimization cost factor corresponding to the intermediate optimization capabilities made available to the first intermediate network acceleration device by the third intermediate network acceleration device positioned between the first intermediate network acceleration device and the second intermediate network acceleration device along the first path, and a second set of cost factors for a second path from the first intermediate network acceleration device to the second intermediate network acceleration device, wherein the second set of cost factors includes at least one direct optimization cost factor corresponding to the direct optimization capabilities made directly available to the first intermediate network acceleration device by the second intermediate network acceleration device, wherein the second path comprises a direct path from the first intermediate network acceleration device to the second intermediate network acceleration device that does not include any other intermediate network acceleration devices, wherein the control unit selects either the first path or the second path over which to forward the network traffic based on the first set of cost factors and the second set of cost factors, and wherein the at least one network interface forwards the network traffic via the selected one of the first or second paths.

19. The network system of claim 18, wherein the control unit comprises a path selection module that calculates a first cost for the first path based on the first set of cost factors for the first path, calculates a second cost for the second path based on the second set of cost factors for the second path, compares the first and second costs to determine a least expensive path from the first path and the second path and selects the determined least expensive path over which to forward the network traffic, wherein the at least one optimization cost factor corresponding to the intermediate optimization capabilities made available to the first intermediate network device offset other ones of the first set of cost factors to reduce the first cost.

20. The network system of claim 19, wherein the control unit further comprises a classifier module that determines a type of layer seven network application to which each packet the network traffic belongs, wherein the path selection module comprises a data analysis module that calculates a weighted average of the respective first and second sets of cost factors, wherein at least one of a plurality of weights used in computing the weighted average vary by the type of application to which each of the packets of the network traffic belong.

21. The network system of claim 18, wherein the control unit further comprises:

a classifier module that determines a type of layer seven network application to which the network traffic is associated, a path selection module that determines at least one application constraint associated with the determined type of application, and selects either the first path or the second path further based on the determined at least one application constraint.

22. The network system of claim 18, wherein the first set of cost factors comprise link cost factors and adjacency cost factors, wherein the link cost factors include one or more of a latency cost factor and a distance cost factor, and wherein the adjacency cost factors include one or more of a type cost factor that indicates a type of adjacent intermediate network acceleration device, a services available cost factor that indicates services made available by the adjacent network acceleration device, and a flows remaining cost factor that indicates a number of flows remaining in the adjacent network acceleration device.

23. The network system of claim 22, wherein the first set of cost factors further comprise carrier cost factors that include one or more of a data rate cost factor that indicates a rate charged per unit of data and a carrier treatment cost factor that indicates a latency for packets corresponding to a particular type of application.

24. The network system of claim 18, wherein the first intermediate network acceleration device comprises a first Wide Area Network (WAN) Acceleration (X) device, wherein the second intermediate network acceleration device comprises a second Wide Area Network (WAN) Acceleration (X) device, wherein the third intermediate network acceleration device comprises a third Wide Area Network (WAN) Acceleration (X) device, wherein the first network comprises a branch network, and wherein the second network comprises a campus network, and the network system further comprising:

a first Wide Area Network (WAN) that includes the third WX device positioned between the first and second WX devices and through which the first path passes; and a second WAN through which the second path passes.

25. The network system of claim 18, wherein the control unit further includes:

a path selection module that establishes a session with the third intermediate network acceleration device in order to apply one or more services to the network traffic that correspond to the intermediate optimization capabilities made available to the first intermediate network acceleration device; and a servicing engine that applies the one or more services in accordance with the session prior to forwarding the traffic via the first path in order to optimize the network traffic, and wherein the network interface forwards the optimized network traffic via the first path.

26. The network system of claim 18, wherein a total cost associated with the first path is based on the first set of cost factors, wherein cost factors of the first set of cost factors other than the at least one optimization cost factor increase the total cost associated with the first path, and wherein the at least one optimization cost factor reduces the total cost associated with the first path.

27. A non-transitory computer-readable medium comprising instructions for causing a programmable processor to:

receive, with a first intermediate network acceleration device, network traffic from a first network for delivery to a second network;

receive, with the first intermediate network acceleration device, a first communication from a second intermediate network acceleration device indicating intermediate optimization capabilities made available by the second intermediate network acceleration device;

receive, with the first intermediate network acceleration device, a second communication from a third intermediate network acceleration device included in the second network indicating direct optimization capabilities made available by the third intermediate network acceleration device;

determine, with the first intermediate network acceleration device, a first set of cost factors for a first path from the first intermediate network acceleration device to the third intermediate network acceleration device, wherein the first set of cost factors include at least one optimization cost factor corresponding to intermediate optimization capabilities made available to the first intermediate network acceleration device by the second intermediate network acceleration device positioned between the first intermediate network acceleration device and the third intermediate network acceleration device along the first path;

determine, with the first intermediate network acceleration device, a second set of cost factors for a second path from the first intermediate network acceleration device to the third intermediate network acceleration device, wherein the second set of cost factors includes at least one direct optimization cost factor corresponding to the direct optimization capabilities made available to the first intermediate network acceleration device by the third intermediate network acceleration device, and wherein the second path comprises a direct path from the first intermediate network acceleration device to the third intermediate network acceleration device that does not include any other intermediate network acceleration devices;

select, with the first intermediate network acceleration device, either the first path or the second path over which to forward the network traffic based on the first set of cost factors and the second set of cost factors; and forward, with the first intermediate network acceleration device, the network traffic via the selected one of the first or second paths.

* * * * *